United States Patent
Shihadah et al.

(10) Patent No.: US 10,650,442 B2
(45) Date of Patent: May 12, 2020

(54) SYSTEMS AND METHODS FOR PRESENTATION AND ANALYSIS OF MEDIA CONTENT

(71) Applicants: Amro Shihadah, McLean, VA (US); Mohammad Shihadah, McLean, VA (US); Hassan Sawaf, Leesburg, VA (US)

(72) Inventors: Amro Shihadah, McLean, VA (US); Mohammad Shihadah, McLean, VA (US); Hassan Sawaf, Leesburg, VA (US)

(*) Notice: Subject to any disclaimer, the term of this patent is extended or adjusted under 35 U.S.C. 154(b) by 1725 days.

(21) Appl. No.: 13/840,893

(22) Filed: Mar. 15, 2013

(65) Prior Publication Data

US 2013/0282532 A1    Oct. 24, 2013

Related U.S. Application Data

(63) Continuation-in-part of application No. 13/626,065, filed on Sep. 25, 2012.
(Continued)

(51) Int. Cl.
*G06Q 30/00*    (2012.01)
*H04W 88/02*    (2009.01)
(Continued)

(52) U.S. Cl.
CPC ......... *G06Q 30/0641* (2013.01); *G06Q 30/00* (2013.01); *H04N 7/173* (2013.01); *H04N 21/4722* (2013.01); *H04N 21/8352* (2013.01); *H04W 88/02* (2013.01); *H04N 21/4126* (2013.01)

(58) Field of Classification Search
CPC combination set(s) only.
See application file for complete search history.

(56) References Cited

U.S. PATENT DOCUMENTS

| | | |
|---|---|---|
| 7,194,253 B2 | 3/2007 | Ritter et al. |
| 7,519,200 B2 * | 4/2009 | Gokturk et al. ............ 382/118 |

(Continued)

FOREIGN PATENT DOCUMENTS

| | | |
|---|---|---|
| CN | 101901228 | 12/2010 |
| JP | 2003/122757 | 4/2003 |

(Continued)

OTHER PUBLICATIONS

Unknown, "About GetGlue," retrieved Sep. 24, 2012, pp. 1-7, GetGlue.

(Continued)

*Primary Examiner* — Eric R Netzloff
*Assistant Examiner* — Dipen M Patel
(74) *Attorney, Agent, or Firm* — Nixon & Vanderhye P.C.

(57) ABSTRACT

Information is provided a user of a mobile device. Media content is sensed by the mobile device and sent to an information processing server. The information processing server also obtains media content from another source and associates at least a portion of the obtained media content with a product or service offer. The sensed media content is correlated to the obtained media content such that an associated buy or service offer is selected. The buy or service offer is sent to the mobile device for display to the user.

13 Claims, 27 Drawing Sheets

Related U.S. Application Data

(60) Provisional application No. 61/586,349, filed on Jan. 13, 2012.

(51) Int. Cl.
*H04N 7/173* (2011.01)
*H04N 21/8352* (2011.01)
*H04N 21/4722* (2011.01)
*G06Q 30/06* (2012.01)
*H04N 21/41* (2011.01)

(56) References Cited

U.S. PATENT DOCUMENTS

| | | | |
|---|---|---|---|
| 7,565,139 B2 * | 7/2009 | Neven et al. | 455/414.3 |
| 7,627,502 B2 | 12/2009 | Cheng et al. | |
| 7,751,805 B2 * | 7/2010 | Neven et al. | 455/414.3 |
| 7,787,697 B2 | 8/2010 | Ritzau et al. | |
| 7,809,722 B2 * | 10/2010 | Gokturk et al. | 707/736 |
| 7,899,252 B2 | 3/2011 | Boncyk et al. | |
| 7,962,128 B2 | 6/2011 | Neven et al. | |
| 8,108,342 B2 * | 1/2012 | Salinas | G06F 17/30781 707/621 |
| 8,321,293 B2 | 11/2012 | Lewis et al. | 705/26.1 |
| 8,458,038 B2 * | 6/2013 | Ando | 705/26.1 |
| 8,489,115 B2 * | 7/2013 | Rodriguez et al. | 455/456.1 |
| 9,264,785 B2 * | 2/2016 | Mallinson | G06F 17/30026 |
| 2006/0240862 A1 * | 10/2006 | Neven et al. | 455/550.1 |
| 2007/0133947 A1 * | 6/2007 | Armitage et al. | 386/95 |
| 2008/0091713 A1 | 4/2008 | Candelore et al. | |
| 2008/0092045 A1 | 4/2008 | Candelore | |
| 2008/0098432 A1 | 4/2008 | Hardacker et al. | |
| 2008/0177640 A1 * | 7/2008 | Gokturk et al. | 705/27 |
| 2008/0199150 A1 | 8/2008 | Candelore | |
| 2008/0279481 A1 | 11/2008 | Ando | |
| 2009/0102859 A1 | 4/2009 | Athsani et al. | |
| 2010/0103241 A1 | 4/2010 | Linaker | |
| 2011/0082735 A1 | 4/2011 | Kannan et al. | |
| 2011/0154411 A1 | 6/2011 | Feher | |
| 2011/0173100 A1 | 7/2011 | Boncyk et al. | |
| 2012/0011550 A1 | 1/2012 | Holland | |
| 2012/0240151 A1 * | 9/2012 | Tapper | H04N 21/4104 725/32 |

FOREIGN PATENT DOCUMENTS

| | | |
|---|---|---|
| JP | 2006/085392 | 3/2006 |
| WO | WO 2007/130688 | 11/2007 |
| WO | WO 2011/001002 | 1/2011 |

OTHER PUBLICATIONS

Unknown, "Shazam," retrieved Sep. 24, 2012, p. 1, Shazam.
Unknown, "Miso-Social TV," retrieved Sep. 24, 2012, pp. 1-2, Miso.
Office Action issued in Application U.S. Appl. No. 13/626,065 dated Oct. 27, 2015.

* cited by examiner

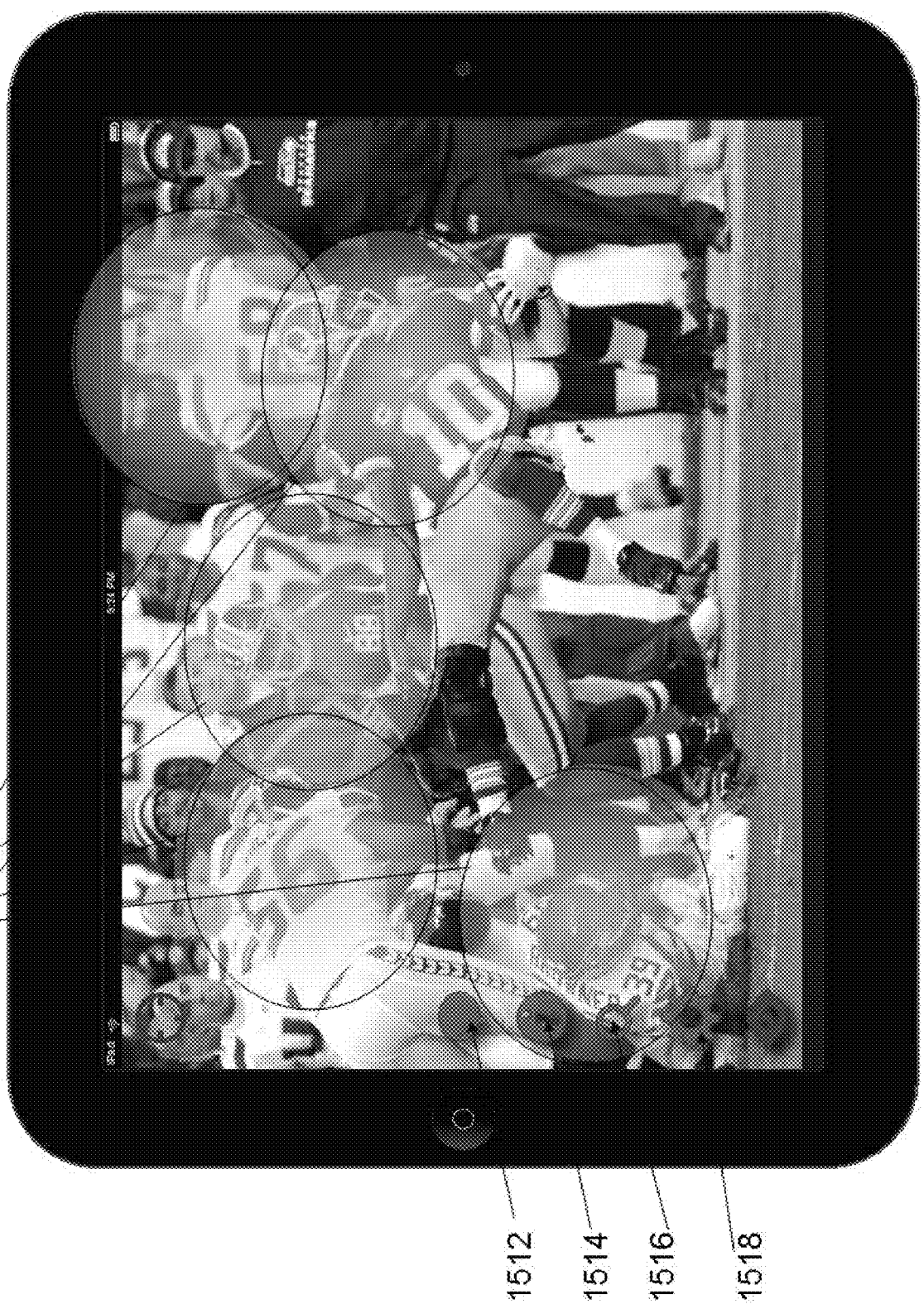

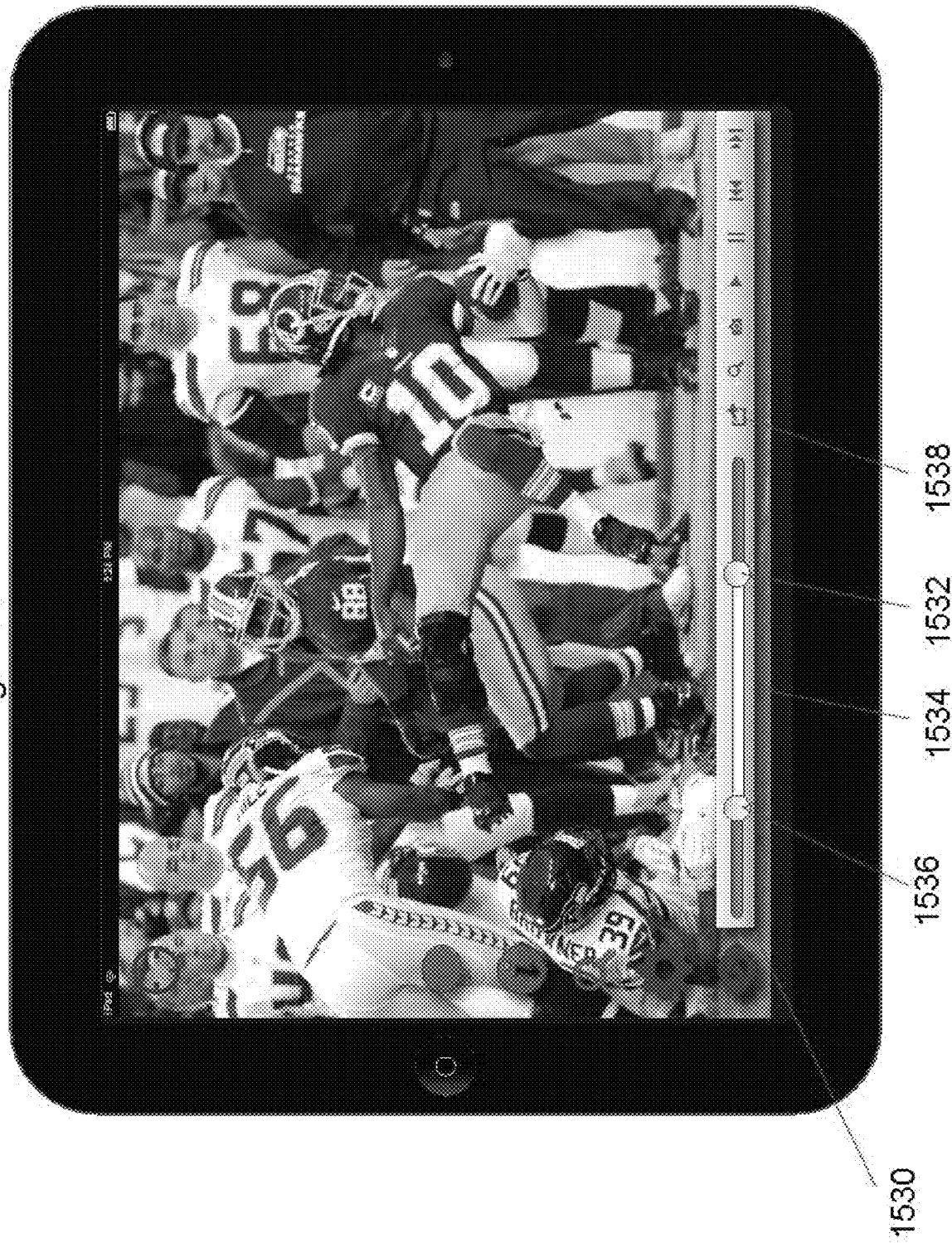

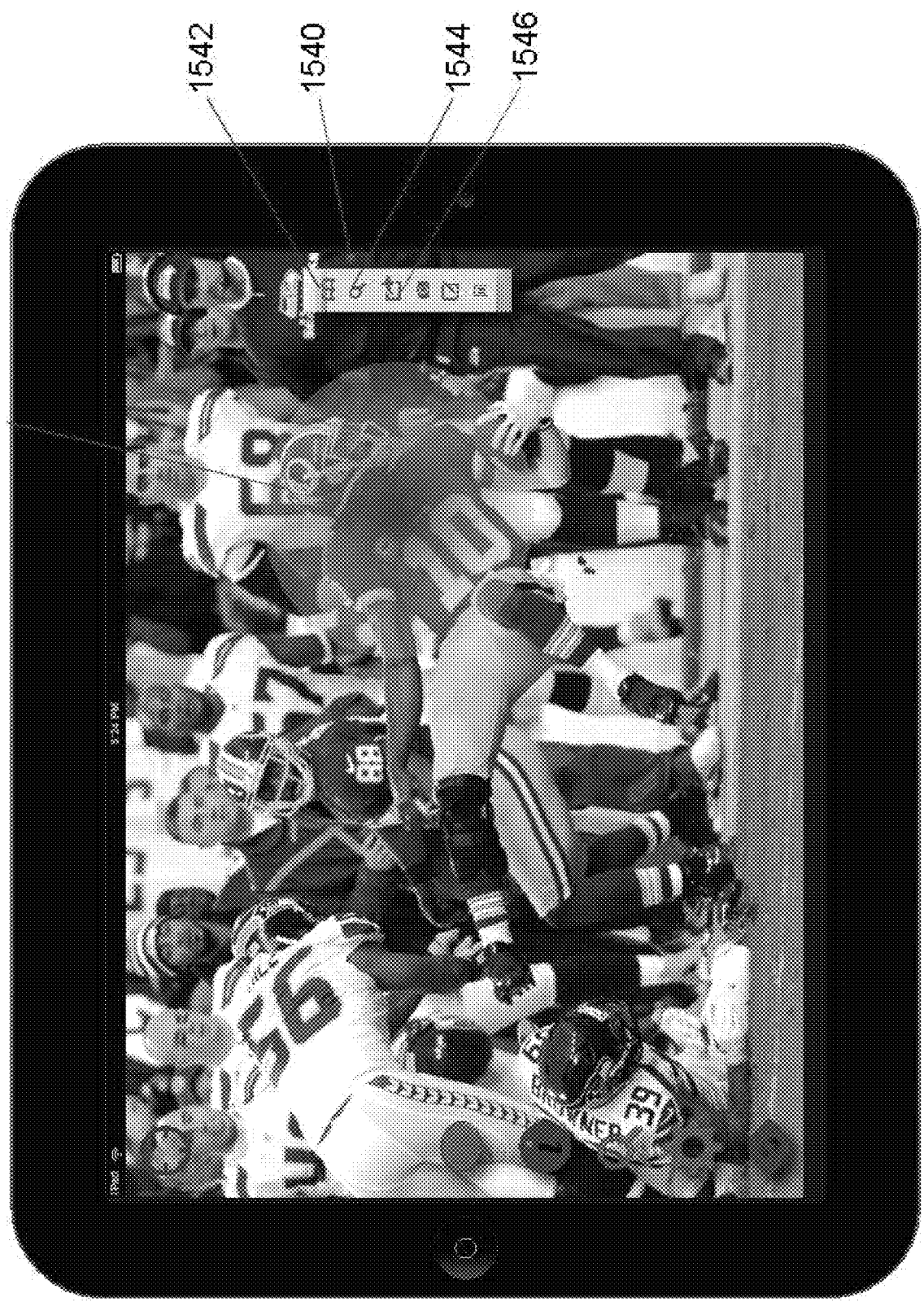

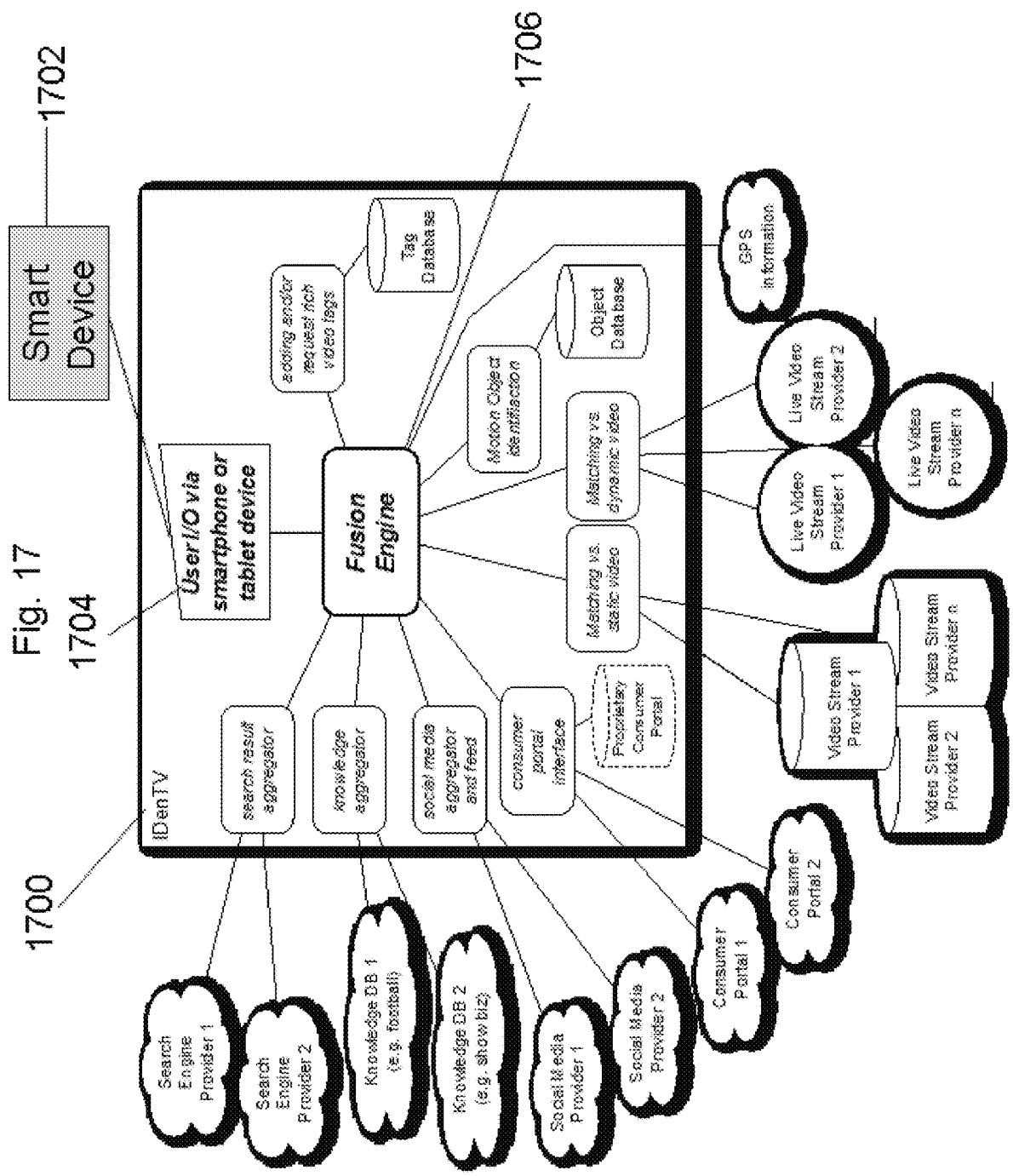

SYSTEMS AND METHODS FOR PRESENTATION AND ANALYSIS OF MEDIA CONTENT

CROSS-REFERENCES TO RELATED APPLICATIONS

This application is a continuation-in-part of application Ser. No. 13/626,065, filed Sep. 25, 2012, which claims priority from provisional application 61/586,349, filed Jan. 13, 2012, the entire contents of which each are hereby incorporated by reference.

STATEMENT REGARDING FEDERALLY SPONSORED RESEARCH OR DEVELOPMENT

FIELD

The technology herein relates to more effective ways to provide information to consumers of media content. More specifically, the technology herein relates to providing users with new ways of interacting with (e.g., capturing) media content and providing, for example, purchasing opportunities based on the interaction.

BACKGROUND AND SUMMARY

Millions of football fans tune in each year to see two teams battle in the Super Bowl for the NFL championship trophy. Because the broadcast viewership for the event is so large (with correspondingly high advertising fees), marketers go to great lengths to create inspirational commercials. Indeed, for some of us, the commercials may be so inspiring that they end up being more interesting than the actual football game. These commercials may then inspire us and end up influencing our purchasing decisions.

Millions of movie goers may also turn out to see the newest James Bond movie that includes a scene with James Bond driving the latest sports car from Aston Martin. Such a sequence, called "product placement," may not be as direct in attempting to influence our purchasing decisions, but may be just as powerful (if not more so) to inspire us to take a certain action. For example, after seeing this scene you may be inspired to go out and buy a sports car.

Both of the above techniques involve situations in which a marketer is seeking to expressly tie your inspiration in the media content to a particular product. However, there is also a vast collection of media content that does not fall into the commercial or product placement categories. Specifically, other scenes in a James Bond movie that are not directly tied to any particular product may also inspire you action. For example, James Bond jumping out of an airplane may inspire you to sign up for a sky diving adventure. Alternatively, older media content may still be highly inspirational. For example, given the passage of enough time, a product placement provided in an earlier James Bond film may provide you with a different inspiration than the one originally intended. Also, older movies such as the Wizard of Oz and Gone With The Wind are still capable of inspiring viewers, but they may inspire viewers to do or buy different things now as compared to when those films were first released back in the 1930s.

Marketers and users would benefit if such inspirations could be tapped and targeted to provide users with opportunities for action on their inspirations when viewing media content. Thus, new and interesting techniques of providing users with such abilities may be desirable.

In certain example embodiments, a media content intake system receives media content and tags portions of the content as being associated with a particular result. In certain example embodiments, the result is a product or a service. In certain example embodiments, the result may include further information (e.g., a make and model of a car that is in the content). A library or database of such tags can be created and maintained.

Consumers are then encouraged to capture and send in portions of media streams they are currently watching, listening to, etc. The portions of the media streams that users capture and send in are analyzed. A comparison is made between the tagged content and the captured media content. When a match is found, the user is sent information associated with the tagged result.

In certain example non-limiting embodiments, automatic identification of TV or movie content and association with product or service offers or location aids is provided via a mobile device. The content may include for example movies, TV shows, advertisements, sports, news, music, entertainment channels, or any form of stimuli that can be sensed and captured electronically. Such content can be delivered live (e.g., a play, a movie, a rock band performance, etc.) or remotely (e.g., by cable television, via a terrestrial or satellite radio, etc.) The mobile device may operate to capture video, audio, and/or images, and relate them to particular goods and/or services. The user may be presented with more information about the goods/services and/or may be presented with options to purchase the goods and/or services.

In certain example embodiments, one or more software modules may be implemented on a processing system that analyzes media content. For example:

A Media platform module may include functionality that
  Creates tagged media content though the automatic processing of channels (e.g., TV channels, internet sources, etc). Tagged information may include:
    Program type, for example: movies, documentary, sports (e.g., NFL, NBA), news, music, T.V. shows, commercials (e.g., Advertisements).
    Time of transmission or broadcast, for example: country, region, city, channel number, network (e.g., HBO, NBC, ABC).
  Provides libraries of searched data, for example on:
    Cars
    Bicycles
    Sports such as golf, football, etc
  Provides multi-functionality support for users so that users may interact with certain services in more than one language (e.g., English, Arabic, Spanish)
  Accepts or uploads advertising content with tagged or associated information, for example:
    Scene information
    Frames of the advertisement
    A logo associated with the advertisement
    Speech data (e.g., a finger print for speech in the advertisement)
    VOCR (Video Optical Character Recognition) textual data
    A telephone number (e.g., for linking to an IVR)
    Possible actions that may be taken in relation to the Ad:
      Connect to Purchase goods
      Connect to Website
  Geographical data, for example: national, regional, or local listings
Automatic Speech Recognition (ASR) engines
Finger Printing Of Advertisements Video Optical Character Recognition (VOCR)
Automatic searches in an image collection
Automatic structure detection from structure
Mobile server Interfaces
Facial Recognition
User profile that may include information such as, for example,
  Name, email, telephone number (e.g., home, work, cell), payment options, billing information, the devices that are registered (e.g., iPhone, Android mobile devices), buying history, wish list, interests, etc Integration and/or Interface Modules may also be included, for example:
Interactive Voice Response
Web Servers
Payment methods, for example: PayPal, wallet, mobile
Social Media such as Face book, twitter, and other services Mobile clients for use by users may be implemented for various mobile device platforms, such as the Apple's iPhone or iPod, the Android platform, or other types of mobile phones, devices, tablets, etc.
  Such clients may include functionality that allows integration with pre-existing commercial implementations (e.g., an application store, a music store, or the like).
  The client may include user interfaces that allow for easy recordation of content and forwarding to a server for analysis.
  The client may include audio, video, and/or image compression technology.

Billing and financial systems may also be integrated with various other systems and/or modules according to certain example embodiments.

In certain example embodiments, a rover module may be used to assist in identifying content. The identification process may use multiple "paths" to increase confidence that the product, service, or other item being identified is correct. For example, video, voice, ISR, and other features of media content may be analyzed simultaneously (or in series) to identify a target piece of media.

In certain example embodiments, a method of providing information to a user of a mobile device that includes at least one imaging system that is configured to obtain media content is provided. The mobile device is operable to communicate with an information processing server. First media content is received from the mobile device, the first media content obtained through the at least one imaging system of the mobile device. Second media content is obtained that is from a media source that is different than the mobile device. At least one product is associated with the second media content. The first media content is processed to obtain at least one feature of the first media content. A matching analysis process is performed on the first media content against the second media content based on the at least one feature. A result to the mobile device is sent that indicates whether or not a match to the first media content was identified.

In certain example embodiments, a processing server system that analyzes media content that is uploaded via mobile devices by users is provided. The system includes a memory storage medium. The system also includes at least one processor. The at least one processor is structured to receive first media content from a mobile device, the first media content obtained through at least one imaging system that is part of the mobile device. The at least one processor is structured to receive second media content that is from a media source different from the mobile device and store the received second media content in the memory storage medium. The at least one processor is structured to associate at least one product with the second media content. The at least one processor is structured to process the first media content to obtain at least one feature of the first media content. The at least one processor is structured to perform a matching analysis process on the first media content against the second media content based on the at least one feature. The at least one processor is structured to send a result to the mobile device that indicates whether or not a match to the first media content was identified.

In certain example embodiments, a system for analyzing media content and providing buying opportunities to users of a mobile device is provided. The system includes a mobile device including at least one imaging system that is configured to obtain first media content in response to user input. The system includes a processing system that wirelessly communicates with the mobile device. A processing system is structured to receive the first media content that is obtained via the mobile device. A processing system is structured to receive second media content that is from a media source different from the mobile device and store the received second media content in a memory storage medium. A processing system is structured to associate at least one tagged feature with the second media content. A processing system is structured to store at least one product in the storage medium in association with the second media content. A processing system is structured to in response to receipt of the first media content, process the first media content to obtain at least one feature in the first media content. A processing system is structured to perform a matching analysis process on the first media content against the second media content based on comparing the at least one feature to the at least one tagged feature. A processing system is structured to send a result to the mobile device that indicates the at least one product is associated with the first media content in response to a successful matching process.

BRIEF DESCRIPTION OF THE DRAWINGS

These and other features and advantages will be better and more completely understood by referring to the following detailed description of exemplary non-limiting illustrative embodiments in conjunction with the drawings of which.

FIGS. 15A-15G are screenshots that illustrate a non-limiting television content identification process according to certain example embodiments;

FIG. 17 is a block diagram of a system that provides interactive functionality to a user viewing video content according to certain example embodiments.

DETAILED DESCRIPTION

Figure 1:
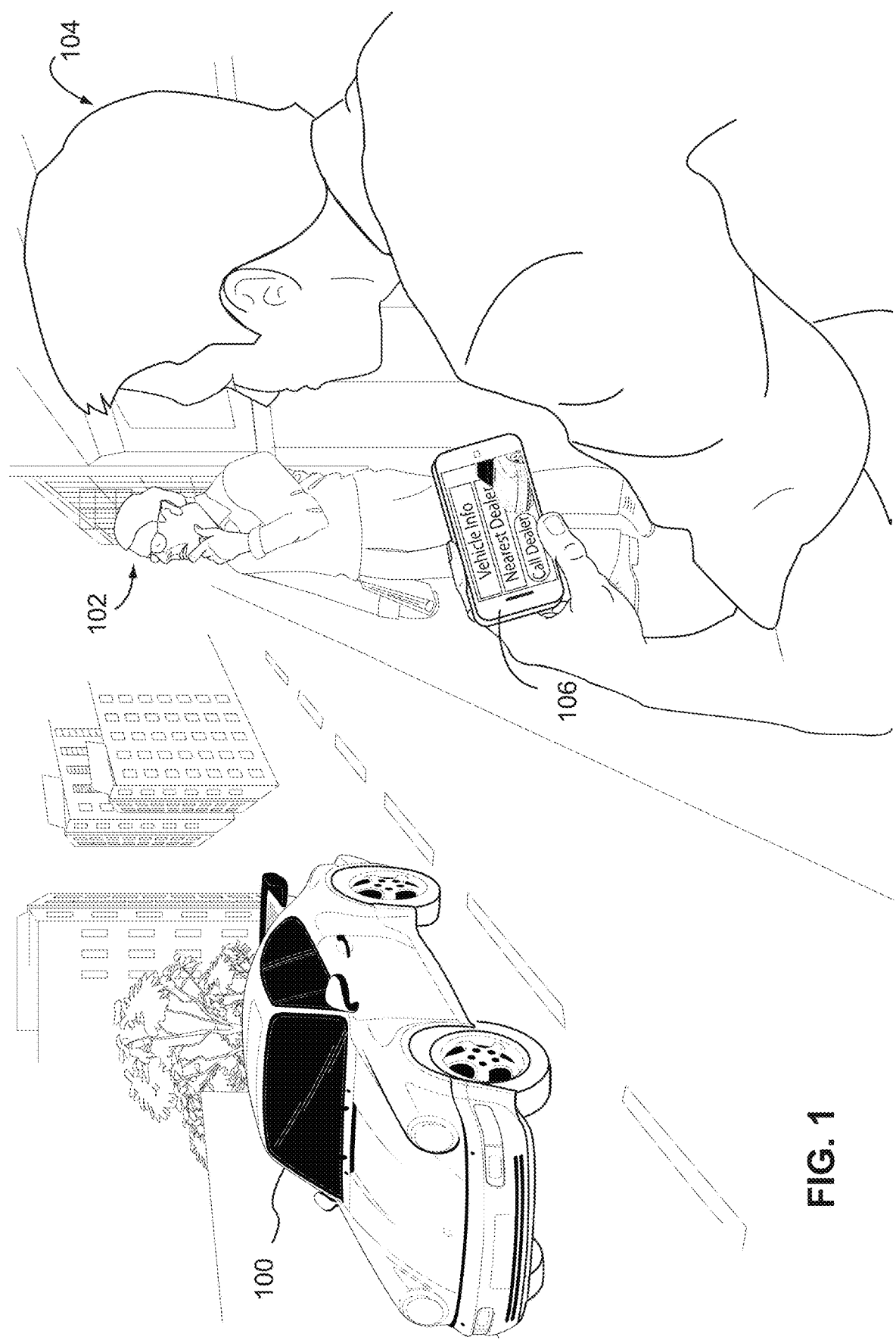
FIG. 1 shows a user interfacing with an example implementation of a media presentation system according to certain example embodiments.

FIG. 1 shows an exemplary scene of two people (Person 102 and Person 104) viewing a car 100 that is driving by on a road. Person 102 would like additional information on the car 100 (indicated by the thoughtful expression). However, other than seeing that the car was red and a Ford, person 102 did not glean any extra information about the car as it drove by. After seeing the car person 102 may wonder: where the nearest Ford dealer is; what type of car was that exactly; what mileage does it get; how much does it cost; are there any used models for sale; are there any comparable models from different car manufacturers? All of these questions may jump through person 102 upon seeing the car. However, as person 102 is on a sidewalk, there is likely no easy way to retrieve the answers to these questions.

Like person 102, person 104 is also intrigued by the car. However, unlike person 102, person 104 has a mobile device that implements a client of a media analysis system. As explained in greater detail below, with such a client, person 104 may take a picture of the car 100 as it passes and send it to a media analysis system. The media analysis system may then return information related to the identified vehicle. For example, the returned information may include additional vehicle information (e.g., its estimated mpg, price, etc), a map that directs him to the nearest dealer that carries the car, or person 104 may decide to buy the car now. It will be appreciated that other types of information may also be presented to the user.

Figure 2A:
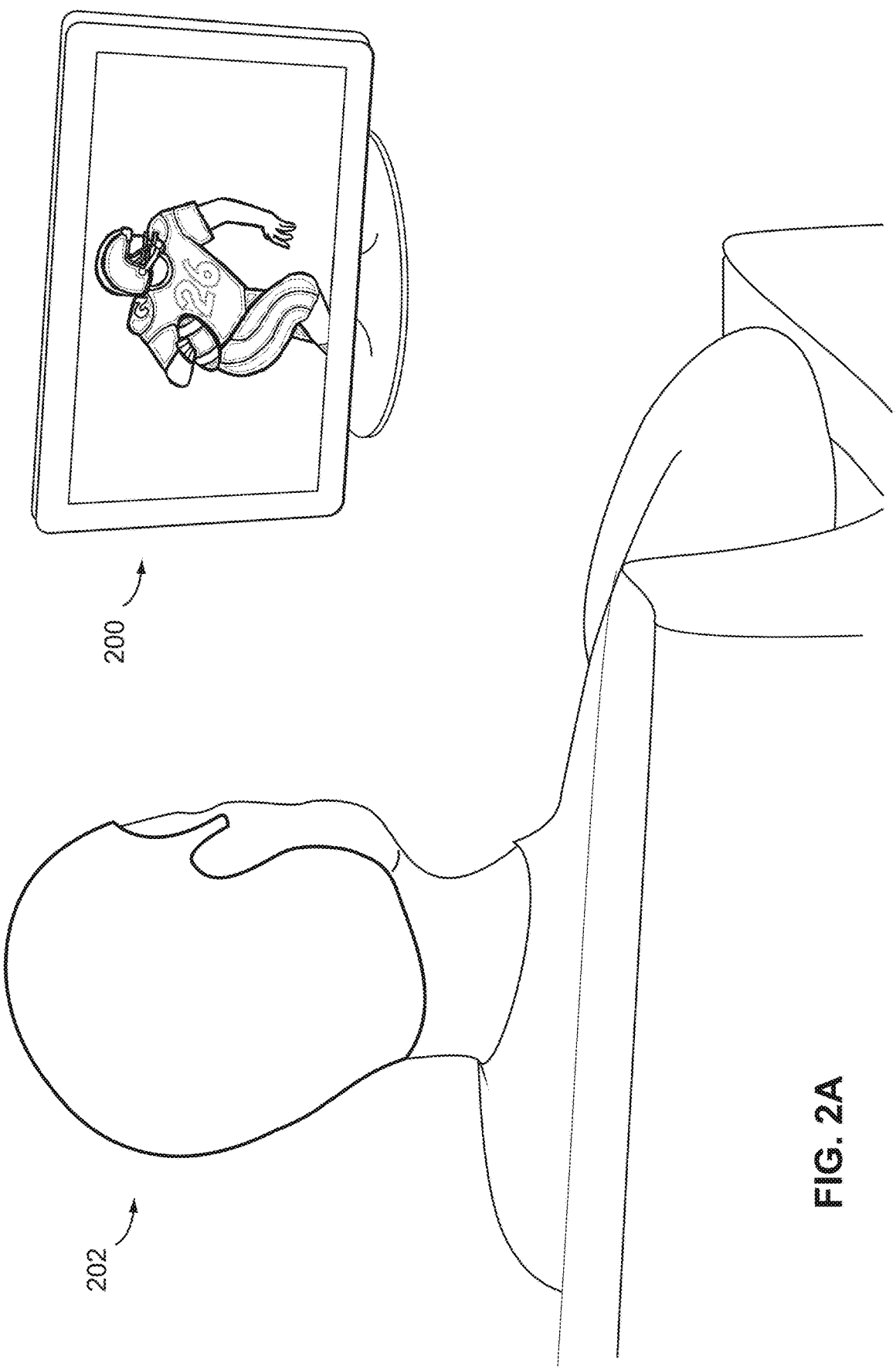
FIGS. 2A-2B show a user interfacing with an example implementation of a media presentation system according to certain example embodiments.
Figure 2B:
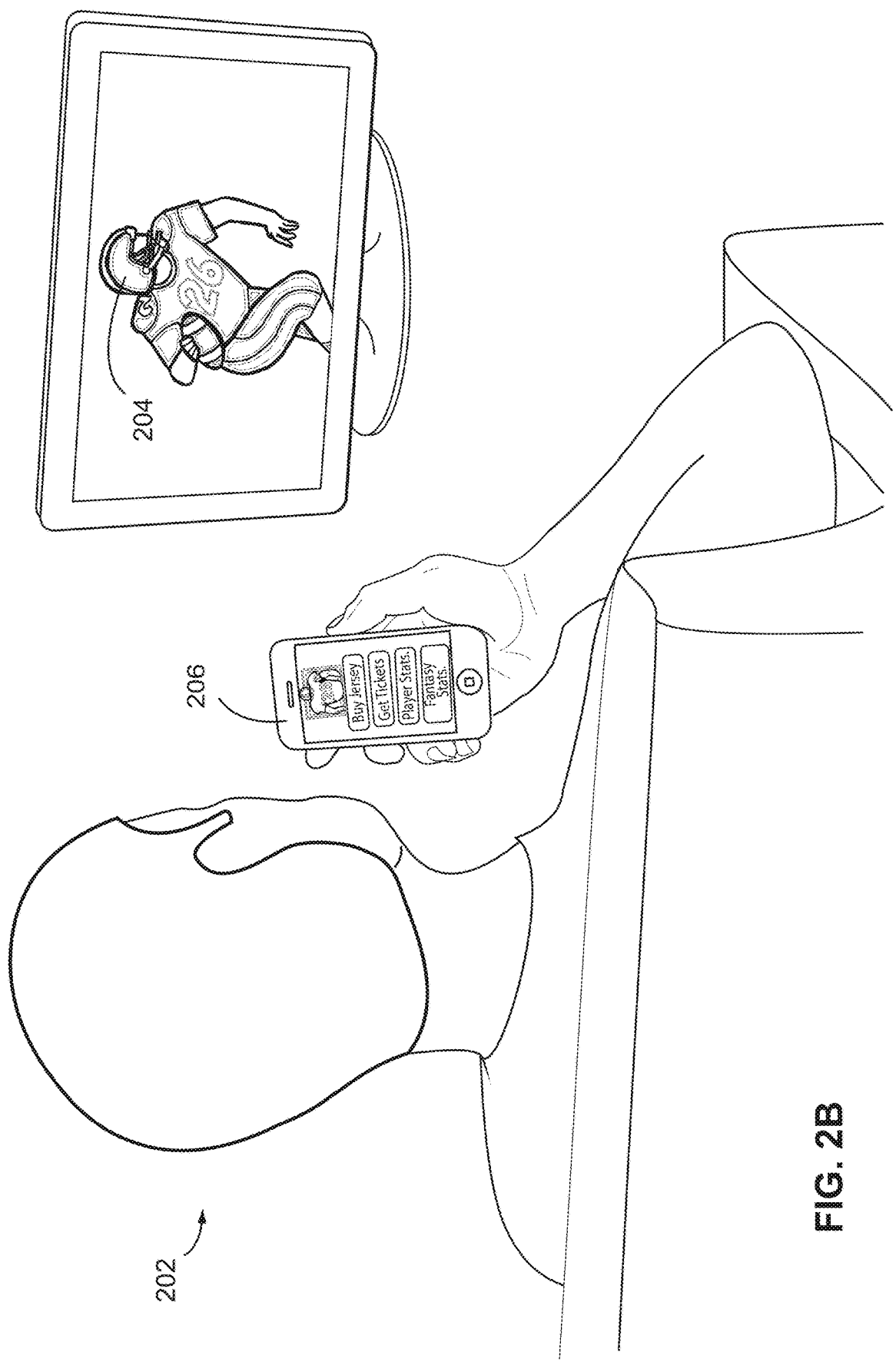

FIGS. 2A-2B show a user interfacing with an example implementation of a media analysis system according to certain example embodiments. In certain example embodiments, a media analysis system may operate in conjunction with television or other broadcast (e.g., radio) content. Here, person 202 is watching a football game on television 200. In the football game being shown on television 200, a football player 204 with a jersey number 26 is holding the football. Football player 204 is a favorite player of person 202. Accordingly, person 202 may take a picture of the television screen. In response to this image may be presented with options to buy the jersey of football player 204, obtain tickets to upcoming football games, obtain player stats, and obtain fantasy stats on football player 204. As with the scene in FIG. 1, other options may be presented to the user (e.g., a weather report where the game is being played, a list of upcoming games with player 204, etc). In any event, by simply taking a picture and forwarding it onto a media analysis system, a person may be able to access a vast variety of information about a particular person, place, product, etc.

In certain example embodiments, instead of taking a picture a user may record a video or short clip (e.g., 5 seconds). This may apply to "real world" content (e.g., where person 104 obtains a video clip of car 100 driving by) or content broadcast through a television, radio, etc.

Figure 3:
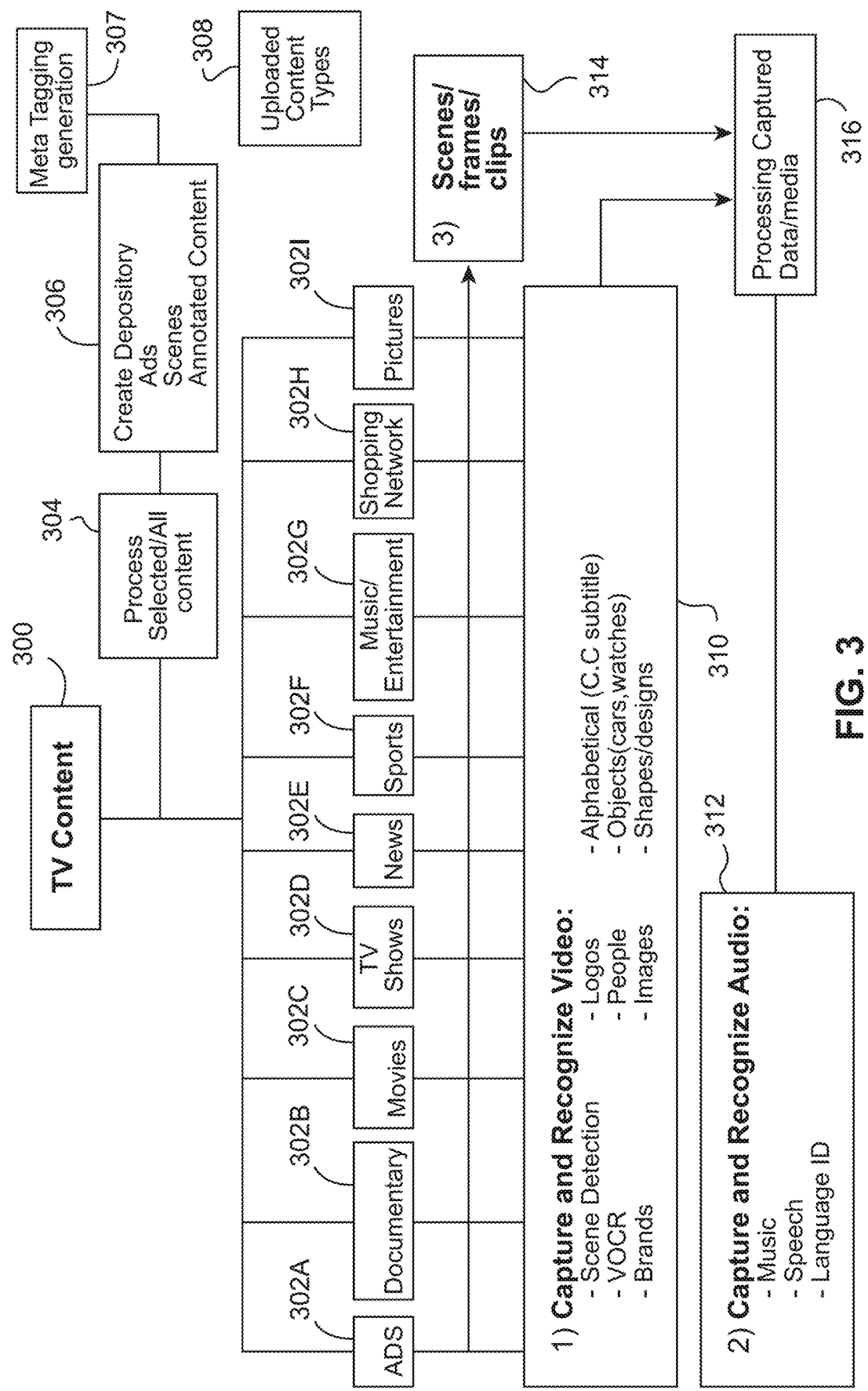
FIG. 3 shows an exemplary process for processing television content according to certain example embodiments.

FIG. 3 shows an exemplary process for selecting television content according to certain example embodiments. Television content 300 may include various types of content: advertisements 302A, documentaries 302B, movies 302C, T.V. shows 302D, news programs 302E, sports programs 302F, music and entertainment programs 302G, shopping network programs 302H, pictures 302I, and the like. A process 304 may select one or more (e.g., all) of the television content types that are broadcast. The selection via this process may enable a content repository to be created at 306. The repository may include various content types including advertisements, scenes from programs, annotated content, etc. The process of storing content may also include annotating or "tagging" the content at 307.

In certain example embodiments, the tagging or annotation of a given piece of content may be an automatic process. In certain example embodiments, partner businesses may specify how their products are related to a given piece of content. For example, a photograph of a flower may be associated with "Joe's Flower Shop" or an NFL football game between teams A and B may be associated with a particular athletic drink sponsor. In certain example embodiments, the tagging process may be a manual process that is carried out by the provider of the analysis service. For example, all of the scenes for a given T.V. show may be tagged for when a particular car brand that the main character drives is shown. As noted above, this information may also be provided by a business partner. For example, the business may specify that at times X, Y, and Z the car is shown. During these times of the program associate our product with this particular car. Thus, if a user uploads a scene or an image that is within those time periods, the user may be presented with information about the car in question. This process may provide more value to the car company as the show uses their product in the particular show. In other words, certain example embodiments may facilitate more effective product placement (e.g., as the placement is more likely to result in a sale).

In certain example embodiments, users (or businesses) may upload content types (e.g., a picture of the car in FIG. 1) in 308.

The T.V. content that is fed into an example media analysis system may capture video at 310, scenes, frames, clips, etc at 314, and/or audio at 312. In certain example embodiments, captured video may be recognized through the detection of a given scene of a program (e.g., the first play of the second quarter in a football game). In certain example embodiments, video content may be analyzed or recognized through the use of Video Optical Character Recognition (VOCR) techniques (e.g., through use of software/hardware/firmware packages). In certain example embodiments, captured audio may be recognized through identification of words spoken. In certain example embodiments, additional processing may take place to automatically identify products, screens, etc. The various types of information captured may be fed into an example media analysis system for a processing of data and/or media at 316.

Figure 4:
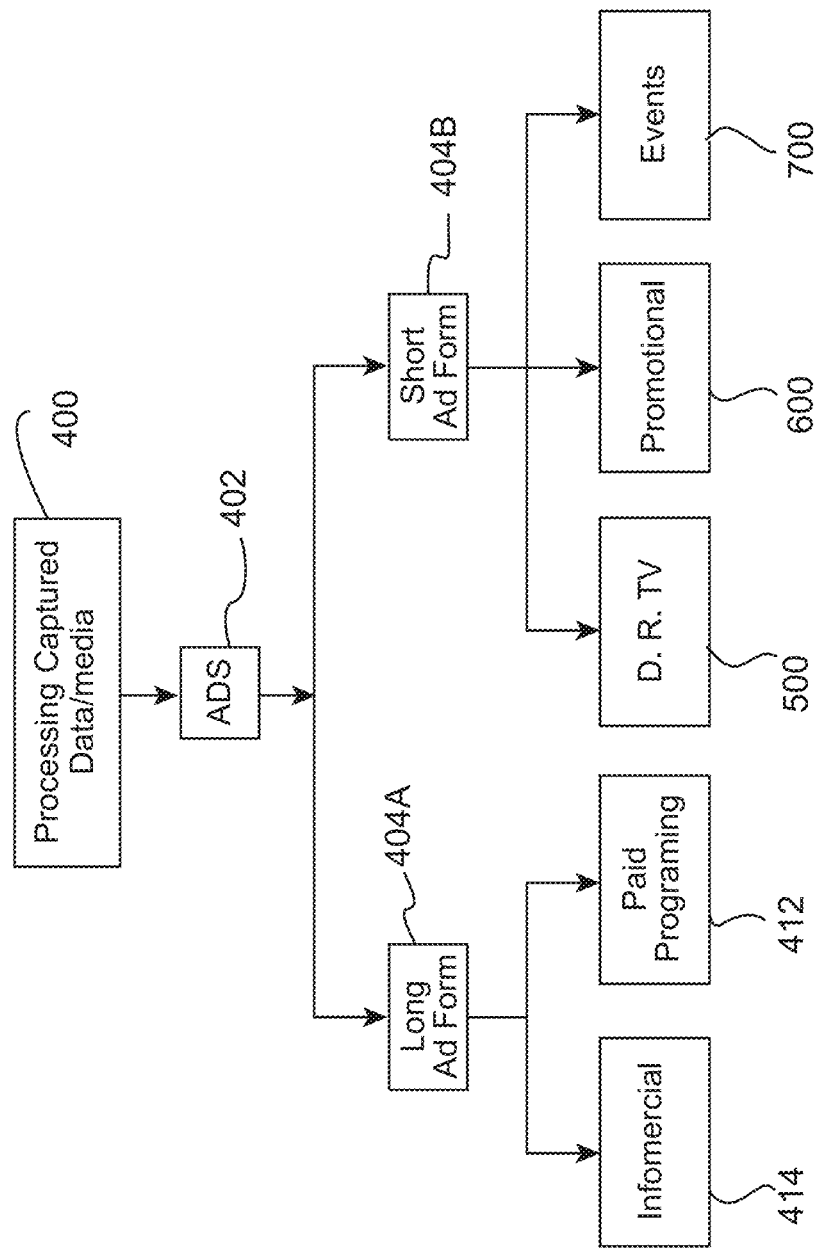
FIG. 4 shows an exemplary process for handling Ad content according to certain example embodiments.

FIG. 4 shows an exemplary process for handling advertising content according to certain example embodiments. The processing of data/media at 400 may involve a determination that the media is an advertisement at 402. A further determination may be made as to whether the ad is a long advertising form 404A or a short advertising form 404B. In certain example embodiments, long ad forms may include infomercials 414, or paid programming 412. In certain example embodiments, short ad forms may include direct response television advertisements 500, promotional advertisements 600, or event advertisements 700.

Figure 5:
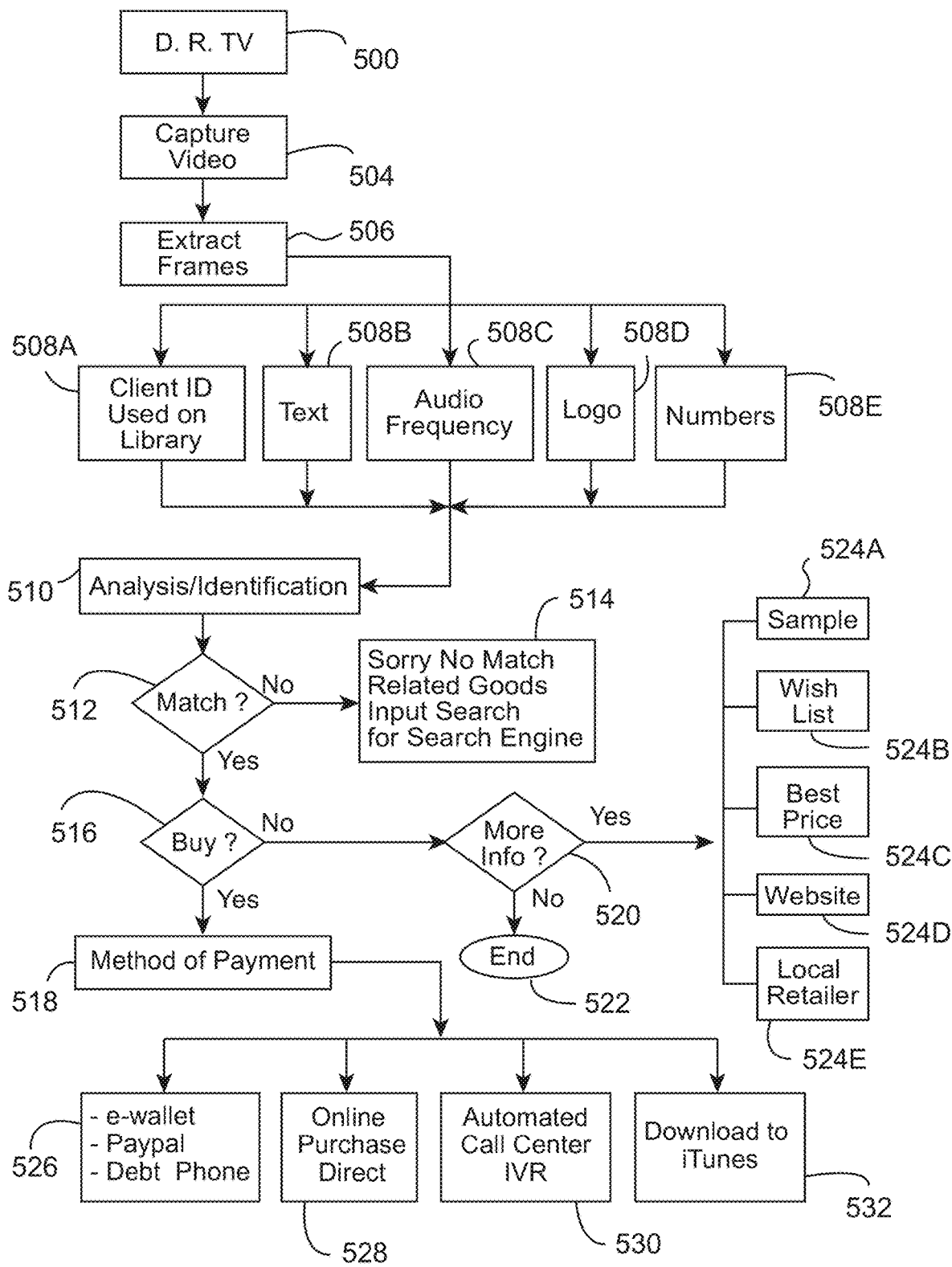
FIG. 5 shows an exemplary process for processing direct response televisions according to certain example embodiments.

FIG. 5 shows an exemplary process for processing direct response televisions according to certain example embodiments. As discussed above, direct response advertising may be identified at 500. Capture video 504 and/or extracted frames 506 may be used to perform an analysis process on the given content. In certain example embodiments, one or more analysis processes may be used for the content in question. For example, a client (e.g., a business or customer) may have associated this particular piece of content with their client ID. Accordingly in 508A, the client ID that is associated with the content may be determined. In 508B, text that is associated with the content may be extracted and/or analyzed. For example, the name on a car or name on a shirt may be recognized. In 508C, the audio frequency(s) may be extracted and/or analyzed from the content. In 508D, logos that are in the piece of content may be extracted. For example, the logo of a car or shoe manufacturer may be identified. In 508E numbers that are in the content may be extracted. For example, "26" from FIG. 2A may be extracted from the shown television picture. As part of 508A-508E, the system may query a database or perform additional analysis on the given, extracted piece of content.

Accordingly, based on the individual determination in 508A-508E an analysis and/or identification may be performed in 510. This may include determining what product, person, place, service, or the like is associated with the determined content. For example, in FIG. 2A the system may determine that the player with the jersey "26" is Frank a favorite of a user.

In certain example embodiments, various actions may be taken once a product, person, place, service, or the like is identified. In FIG. 5 a report is given to the user as to whether or not a match 512 based on the content submitted has been found. If there is no match, a report is returned to the user indicating as such. In certain example embodiments, when a no match report is returned to the user, additional options 514 may be presented to the user. For example, a related goods search may be offered to the user. This may include presenting other car types to the user if the user submitted media that included a car. In certain example embodiments, the user may input additional or supplemental parameters for a further search. In certain example embodiments, the user may resubmit the piece of media that was analyzed.

If a match is identified, the user may be presented with an opportunity to buy a product, service, etc. at 516. Here, the user may select not to pursue the option to buy and select "no." In this case, the user may be presented with an opportunity to view additional information 520. If the user again selects no, the interaction ends at 522. If the user selects yes and desires more information at 520, then one or more additional pieces of information may be presented to the user. For example, a sample may be displayed or offered to the user at 524A. The user may add the product to their wish list 524B. The user may be shown a listing of retailers that offer the product and the best prices at 524C. In certain examples, the user may be provided with a website link 524D (e.g., to Ford's website). In certain examples, the user may be given a map to a local retailer 524E that has the product in question.

If, however, the user selects to buy the product, a payment processing system 518 may be enabled. For the payment process, different types of payment options may be available to the user. For example, e-wallet, PayPal, or a debit phone option (e.g., charged directly to the user's mobile phone plane) in 526 may be used. In certain example embodiments, a direct online purchase 528 may be used (e.g., from a retailer website). In certain example embodiments, the user may have the option of connecting to a call center 530 that can process the user's order. In certain example embodiments, a specialized application on the user's mobile device may be used, such as, for example, iTunes 532.

Figure 6:
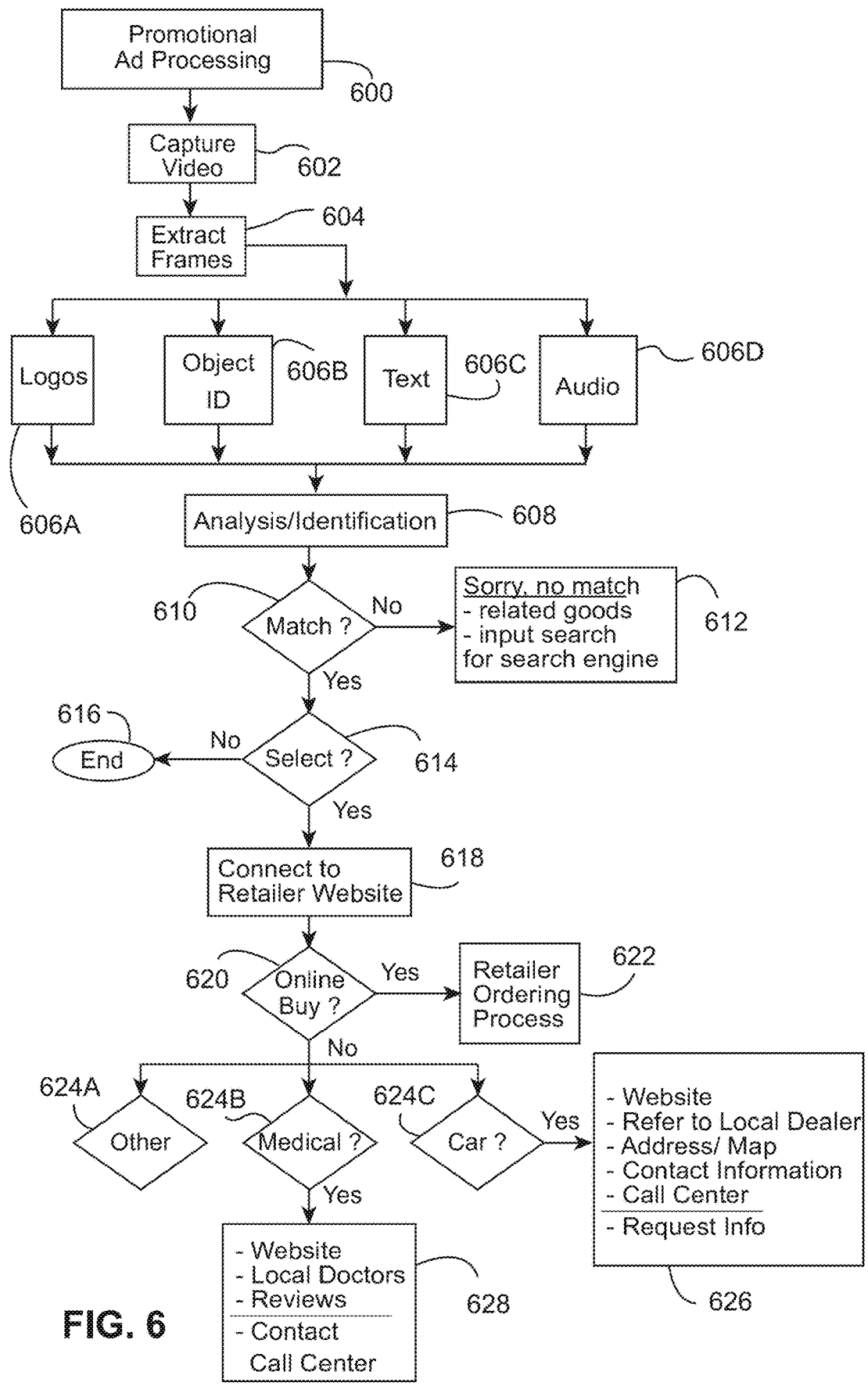
FIG. 6 shows an exemplary process for promotional ad processing according to certain example embodiments.

FIG. 6 shows an exemplary process for promotional advertisement processing 600 according to certain example embodiments. Video may be captured in 602 and frames of the video may be extracted in 604. Logos 606A, an object ID or a client ID may be associated with the video or frame in 606B, text displayed in the video may be identified at 606C, and audio streams may be separated and processed at 606D.

Based on one or more of the above pieces of information, an analysis/identification process may be performed at 608. At 610 the system may determine if a match is found. If no match is found, such a result may be presented to the user at 612. In certain example embodiments, as explained herein, the user may then have the option of requesting information on related goods or inputting additional search information. Such additional information may then be returned to the user with additional options.

If there is a match found, a user may select at 614 to purchase to the product. If the user declines to pursue this option, the process ends at 616. If the user does select the product then the user may be connected to a retailer website at 618. Once connected to the retailer website, the user may choose at 620 to buy the product at 622. The purchase process may be similar to the normal retailer processing for the website. In certain example embodiments, a referral fee or the like may be provide for the analysis and identification service that matched the media content to the product being purchased (e.g., a commission fee).

If the user does not wish to purchase the product online at 620, then the user may be allowed to view other information 624A (e.g., about other products). In certain example embodiments, the product or service may be classified in a medical area. In this case, the user may be given extra information 628 regarding health information, local doctors, reviews of products and/or services, or the option to contact a call center (e.g., to setup a medical appointment, order products, ask medical questions, etc). In certain example embodiments, the product in question may be determined to be a car in 624C. If the product is a car, then additional information may be provided to the user (e.g., a website, information on a local dealer, address of the dealer, along with contact information). In certain instances, the user may be offered the option to request additional information. For example, technical details on certain aspects of the car.

Figure 7:
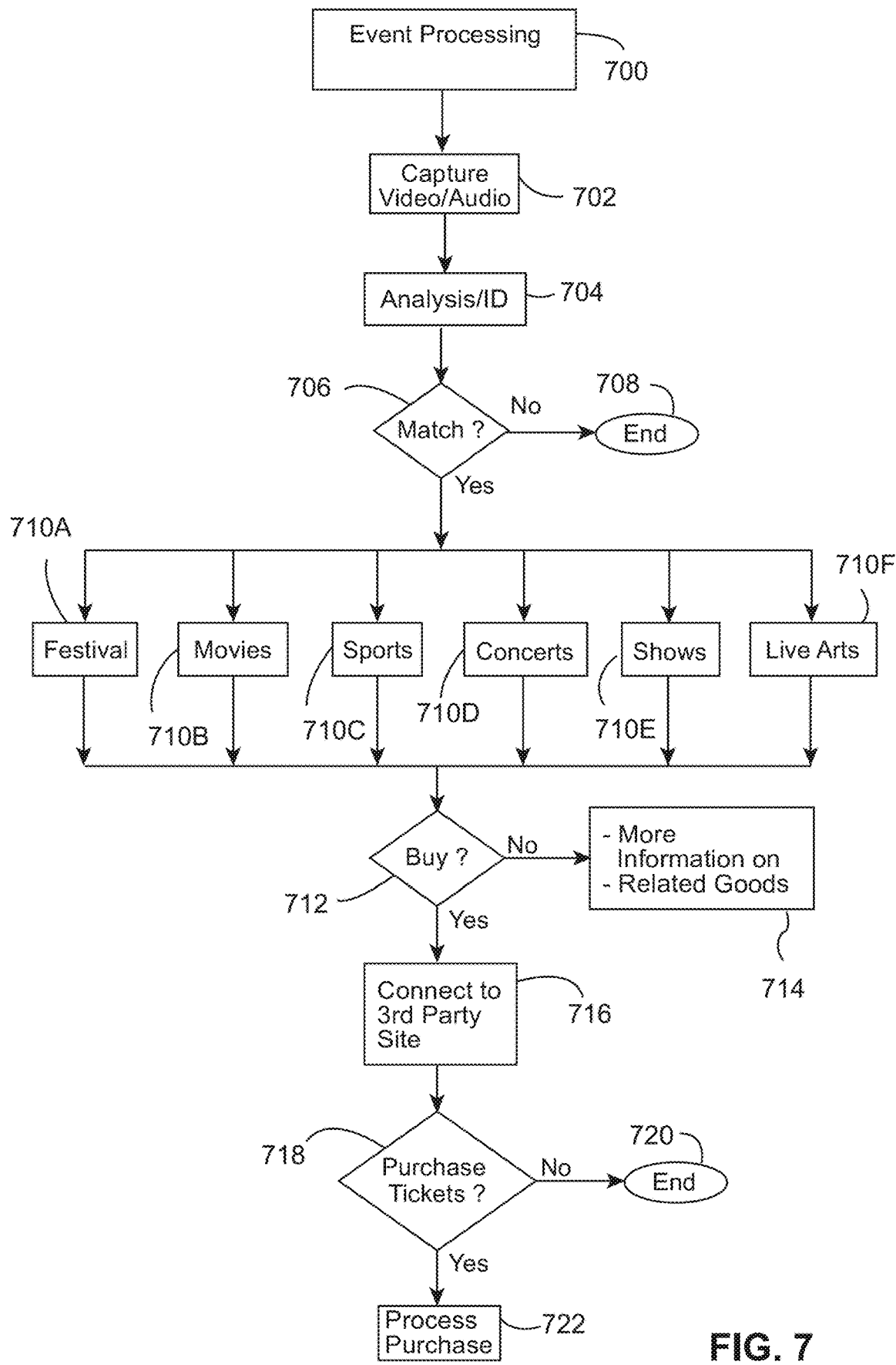
FIG. 7 shows an exemplary process for event processing according to certain example embodiments.

FIG. 7 shows an exemplary process for event processing according to certain example embodiments. Certain types of media content may relate to events (e.g., concerts, rallies, etc). Media related to events may be processed at 700 via capturing video and/or audio 702 and subsequent analysis thereof at 704 to determine if there is a match 706 in the content database. If no match is found the process may end at 708. If there is a match it may be classified as being associated with one or more types of events. For example, a festival 710A, movies 710B, sports 710C, concerts 710D, shows 710E, live arts 710F.

Depending on the type of event, the user may be offered a chance to purchase tickets to the event in question at 712. If the user declines they may be presented with more information on goods/services that are related at 714. If the user decides to pursue a purchase they may be connected to a third party site 716. In certain example embodiments, the payment process may be handled internally with the analysis of the media content. The user may be presented with another chance to exit out of the ticket buying process at 718. If the user decides to stop, then the process ends at 720. If the user still desires to purchase tickets, then a purchase process may be presented to the user at 722. In certain example embodiments, the media analysis system may present the user with an immediate buying opportunity (e.g., 1-click shopping).

It will be appreciated that other types of content may be processed. The content may be, for example, content from a television or may be so called "user-generated" content in which the user submitted content is of real objects.

Figure 8A:
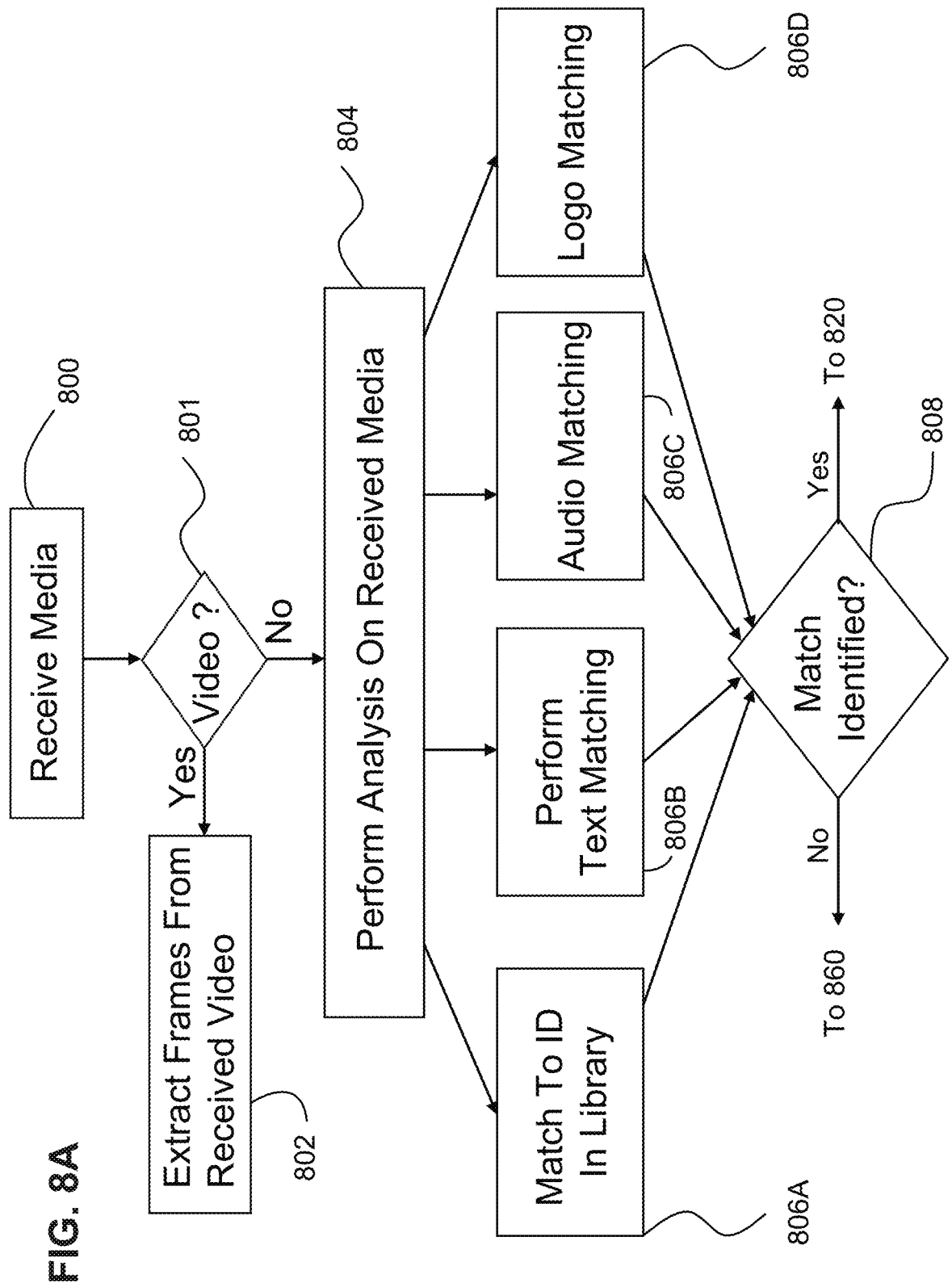
FIG. 8A is an exemplary process for matching media content according to certain example embodiments.

FIG. 8A is an exemplary process for matching media content according to certain example embodiments. In step 800 media content may be received from a user with a mobile phone. A check may be performed at 801 to determine if the media uploaded by a user is a video. If the content is a video then at 802 frames from the video may be extracted to produce a series of images. Accordingly, in 804 an analysis may be performed on the received media content. In certain example embodiments, the frame extraction process may be skipped and the video may be analyzed, or the extraction process may happen during the analysis process.

In any event, as part of the analysis process in 804, and ID that is associated with the uploaded media content may be matched to a stored library of content at 806A. For example, certain media may have embedded IDs based on who is uploading or where the content is being uploaded from. At 806B, any text that is shown in the media may be identified and analyzed. At 806C audio may be extracted from video media content. Logo's that are present in the media may be automatically identified 806D. For example, the logo of a sports team may be identified. Based on the above analysis processes a match may be identified at 808. In certain example embodiments, the matching of uploaded media to products and/or services may include manually identifying a product in uploaded media. Thus, for example, a user may upload media to an example service which may perform automatic text matching in conjunction with a manual process performed by employees or contract workers. The manual matching process may be used independently or in conjunction with other automatic processes.

Figure 8B:
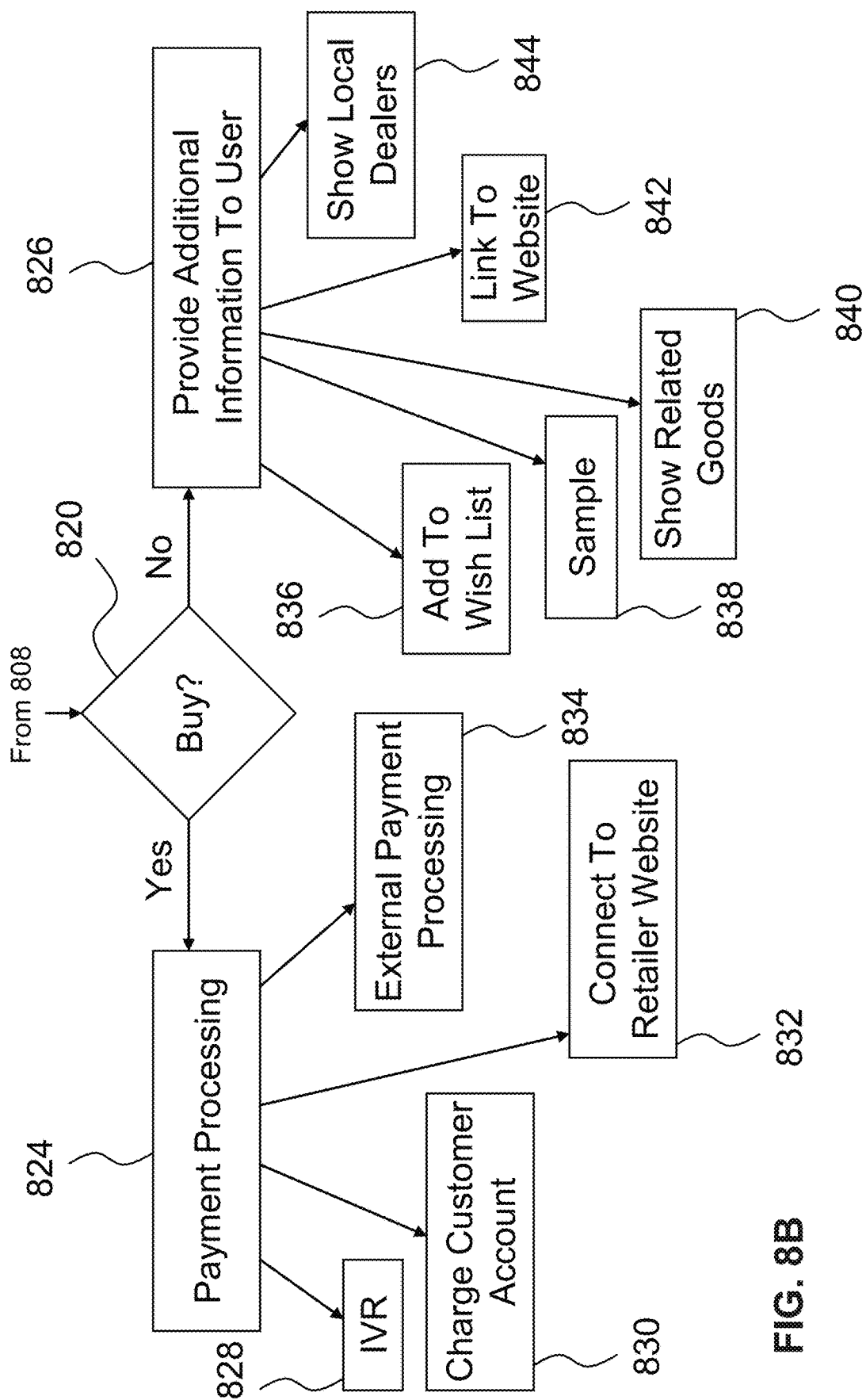
FIG. 8B is an exemplary process for buying a product as a result of matched media content.

If there is a match identified the process proceeds to 820 in FIG. 8B. However, if the processed media content is not matched with a product, service, etc, then the process may proceed to 860 in FIG. 8C.

FIG. 8B is an exemplary process for buying a product as a result of matched media content. If the media that has been processed in FIG. 8A is matched with a particular product, service, etc (or a group thereof), a user may be presented with an option to buy the matched item on their mobile device at 820. When the user selects "yes" the process proceeds to a payment processing option 824. Here, a user may select from one or more of: an IVR 828; charging their account 830; connecting to a retailer website 832; or external payment processing (e.g., a credit card transaction or the like) 834. In certain example embodiments, a user may set a default option that is stored in an exemplary system described herein such that the user does not have to select a payment option. Under such conditions, the user may then simply select to "buy" a product at 820 and based on this stored information the product may be "automatically" purchased for the user. In certain example embodiments, a pass phrase, pin, or other primary or secondary authentication scheme may be implemented.

If the user decides not to purchase the goods/services at 820 then an exemplary system may provide additional information to the user at 826. For example, an option may be presented that allows the user to add the matched product to a wish list 836 that is associated with the user's account. In certain example embodiments, a sample 838 may be provided to the user. This may be a sample for the good involved or the service that is to be provided (e.g., a clip of a movie, a sample pack of perfume, etc). Another option that may be presented to the user is an option showing goods that are related to the matched good at 840. For example, the matched good in question may be from brand A. Thus, the system may also have information on brand B, a competitor of brand A. In certain example embodiments, businesses may partner with a provider of the matching system to always or sometimes show their products to users whenever a similar product is matched.

In other instances, a person may be given the option to link to a website 842. The website may be the website of the company's related good/service or may be another type of site. For example, the linked site may be a review site (e.g., a car article from Consumer Reports or the like). In certain example embodiments, a dealer in the product/service being offered may be shown to the user at 844. As part of this information a map to the dealer may also be shown.

Figure 8C:
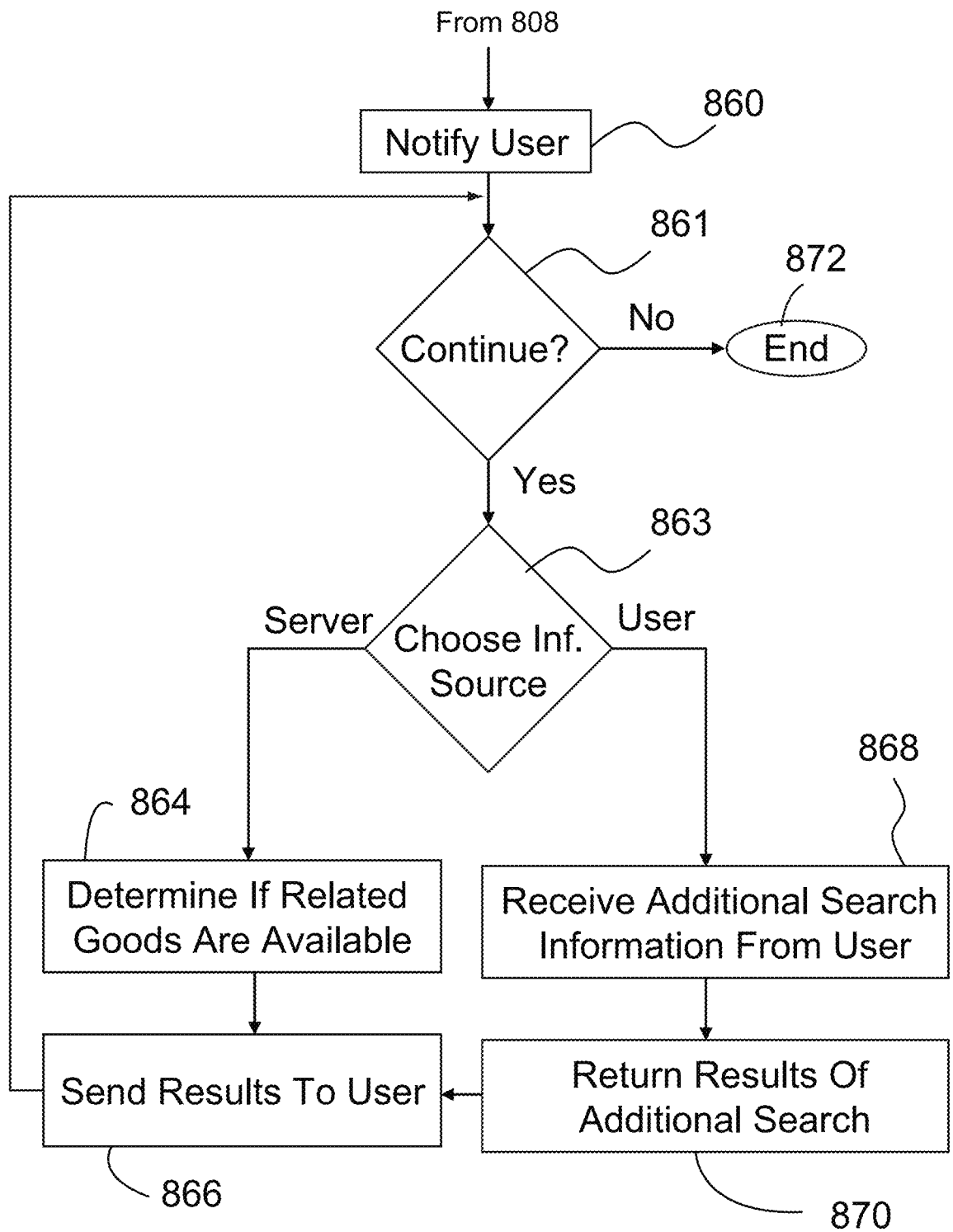
FIG. 8C is an exemplary process if no matches are initially found in media content.

As discussed above, a match for a given product may not be found based on the uploaded content. This may happen because the media is of poor quality, the product/service in question has not been indexed by the service, or the business that makes/provides the product or service is not a partner of the media analysis provide. Thus, FIG. 8C is an exemplary process that is used when no matches are found based on the media provided by the user. If there are no matches found a notification is sent to the user in 860. After receiving the notification the user may be asked if they wish to continue or stop the process at 861. If the user desires to stop, the process ends at 872. If the user desires to continue they may be presented with a choice of pursuing further information at 863. In certain instances, this may include providing additional search information 868. Such information may include further features of the product that is being searched for. Accordingly, in certain example embodiments, the additional information provided by the user in 868 may be paired with the earlier information regarding the media content. In certain examples the search may be an entirely new search that is independent of the earlier provided media content. In any event, results based on the search information may be determined in 870. The results may then be sent to the user in 866 (e.g., to the user's mobile device). In certain example embodiments, the process may end after returning the results. In certain examples, the process may ask if the user desires to conduct another search by returning to 861. In certain examples, the results of the search process may provide the opportunity to purchase the good/service being search for (e.g., as described in FIG. 8B).

Alternatively, or in addition to, providing additional search results, the system may determine goods that are related to the media content that is provided by the user at 864. If there are any goods, the results may be sent to the user in 866. In certain example embodiments, goods that are related to goods or services in the uploaded media content may be presented to the user. For example, if the good in the uploaded media content is from company A, the system may show goods from company B that are stored in an exemplary media processing system. As with the above discussion, a user may end the additional search functionality, provide further search options to the user, and/or allow the user to proceed with a purchase for a user.

As discussed herein, different types of content may be processed by a media processing system. In certain example embodiments, the system may have access to media content in order to enable analysis of the uploaded media content. Thus, for example if a user records a video clip of a football game being shown on television, the system may also have the same football game already in its database (e.g., because it is stored/processed "live").

Figure 9A:
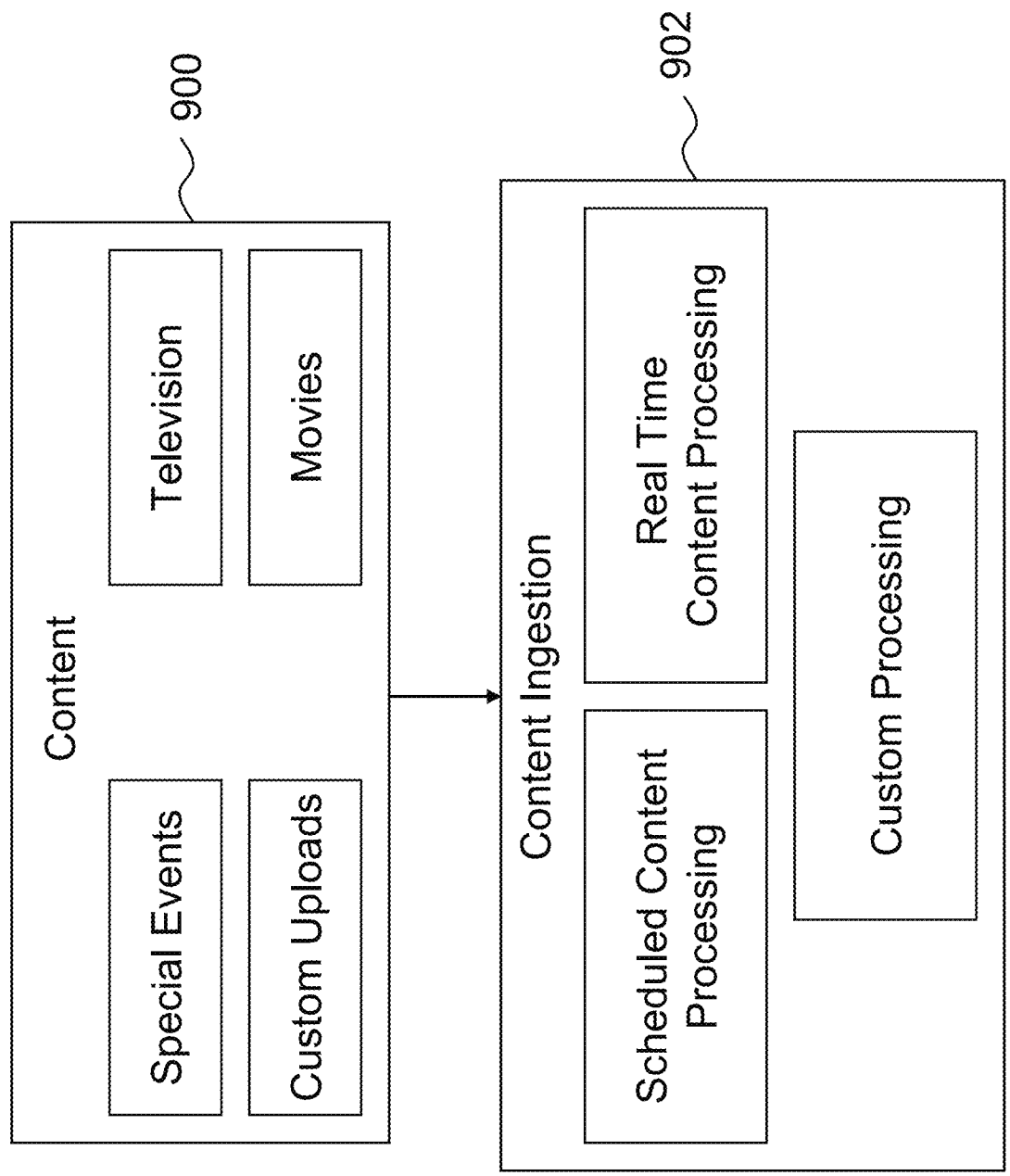
FIG. 9A is an example block diagram showing content ingestion according to certain example embodiments.

FIG. 9A is an example block diagram showing content ingestion according to certain example embodiments. The ingestion 902 of content 900 may include content from special events (e.g., concerts, rallies, etc), regular television shows (e.g., sitcoms), movies (e.g., feature length films shown at a theater), custom uploads. In certain example embodiments, custom uploads may be uploads that are created for an example service/system described herein. For example, a car company may create various movies, images, sounds of one of the automobiles that are produced. This custom content may be used to assist in an exemplary analysis process when a user uploads a piece of content (e.g., when user 104 in FIG. 1 uploads a movie or picture that includes car 100).

The ingestion of content may also be scheduled (e.g., based on a television network schedule). The ingestion may include real-time processing. For example, sports broadcasts are typically "live" broadcasts. In order to provide, for example, user 202 in FIG. 2A with the opportunity to retrieve information on player 26, the game being broadcast may be uploaded and stored in a database in a real-time. Thus, the system may be able to process a user uploaded clip from the same game.

Figure 9B:
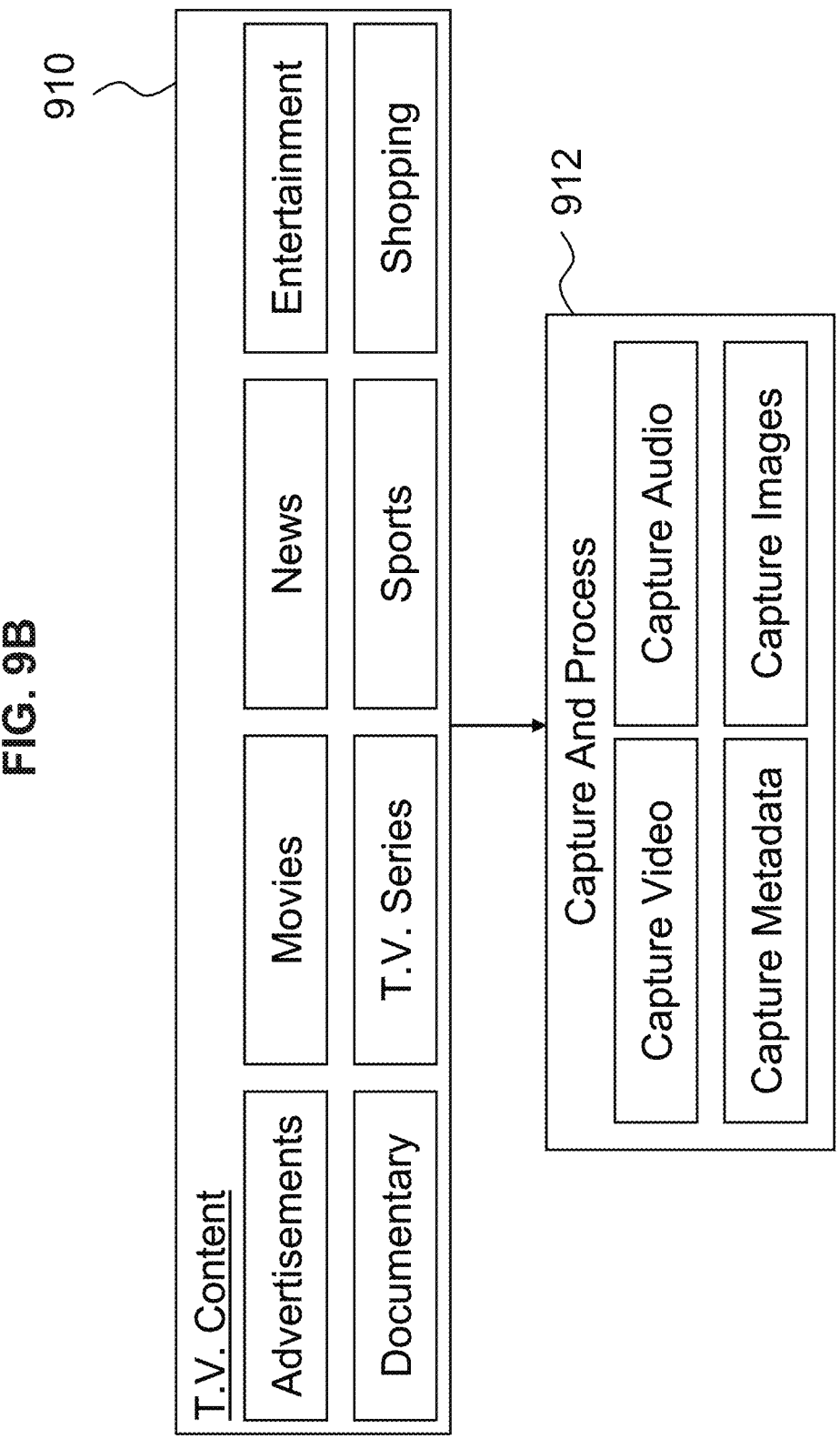
FIG. 9B is an example block diagram for T.V. content processing according to certain example embodiments.

FIG. 9B is an example block diagram for T.V. content processing according to certain example embodiments. Different types of T.V. content 910 may be stored in an example system. For example, advertisements, movies, news, entertainment (e.g., the Oscars), documentaries, T.V. series, sports programs, shopping network presentations, and/or the like may be stored in an exemplary system. The various content types may then be captured and processed at 912 through various techniques. For example, a video stream of the program may be recorded, the audio of the program may be recorded, and metadata (e.g., broadcast time, name of show) may be saved. In certain example embodiments, images may be extracted from a video stream. This may allow for example, a space efficient way of storing the content information (e.g., instead of storing the full T.V. show at 30 frames per second). In certain example embodiments, during the content ingestion process the content may be annotated or tagged with extra "meta" information. For example, a particular scene from a T.V. show may be tagged and/or associated with a product that is used in the show. For example a particular type of car (e.g., an Aston Martin from James Bond) may be tagged into a James Bond movie for scenes in which the car is shown.

Figure 10:
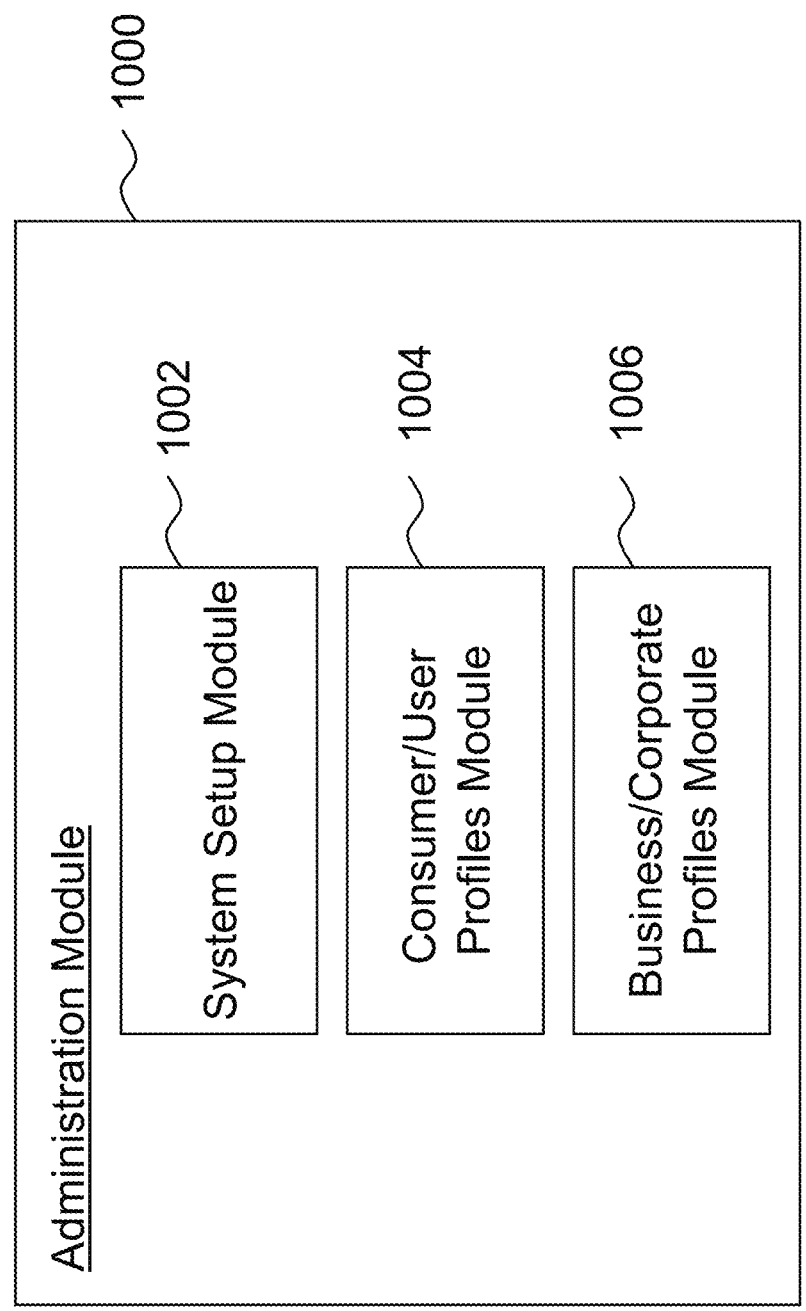
FIG. 10 is an administration module according to certain example embodiments.

FIG. 10 is an administration module according to certain example embodiments. A content analysis and storage system may include an administration module 1000 that provides certain administrative functionality for the operator of the system. A system setup module 1002 may be used for maintenance and/or setup of the central analysis and content storage system. For example, servers may be assigned, content ingestion rules may be defined, etc. The administration module 1000 may include a consumer or user profile module 1004. This module may allow users to set preferences and user information such as, for example, name, email, telephone number, payment options, billing information. This module may also allow users to link particular mobile devices to their accounts. This may involve linking unique identification information from the mobile device (or SIM card) to a user's profile. The profile module 1004 may also include functionality that tracks the usage or purchase history of a user. This may allow, for example, the system to improve analysis of media uploaded by a user. In certain example embodiments, the purchase history of a user may facilitate product suggestions if no service/product is found based on uploaded content from a user. The product history of a particular user may help in matching uploaded content to stored media content by providing a "hint" as to what type of content is being uploaded. For example, if a user always uploads sports related content, the system may search the stored sports content first when analyzing the uploaded content from this particular user.

The administration module may also include a business/corporate profile module 1006. In certain example embodiments, this module may allow business partners to upload content to the service. The content that is uploaded may include additional metadata. In certain example embodiments, this module may allow users to specify how products are presented to users when a match is found. For example, a company may desire to have users directed to their company website.

Figure 11:
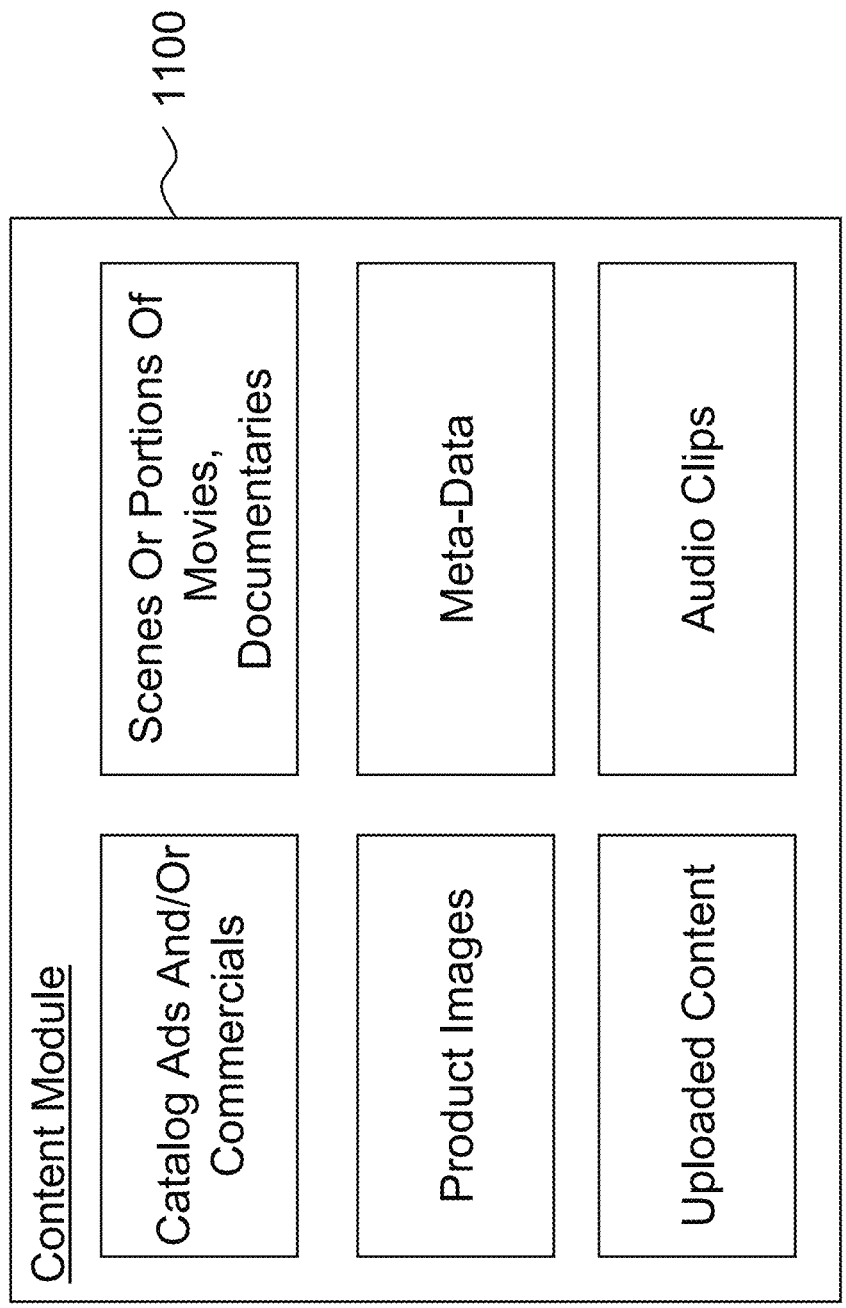
FIG. 11 is a block diagram of a content module according to certain example embodiments.

FIG. 11 is a block diagram of a content module according to certain example embodiments. The content module 1100 may store content that is uploaded by a user or ingested content. An example content module 1100 may include a catalog of advertisements, scenes from T.V. shows, product images (e.g., a picture of a car), meta-data that is associated with various other content (e.g., images, audio, movies), custom uploaded content, and/or audio clips.

Figure 12:
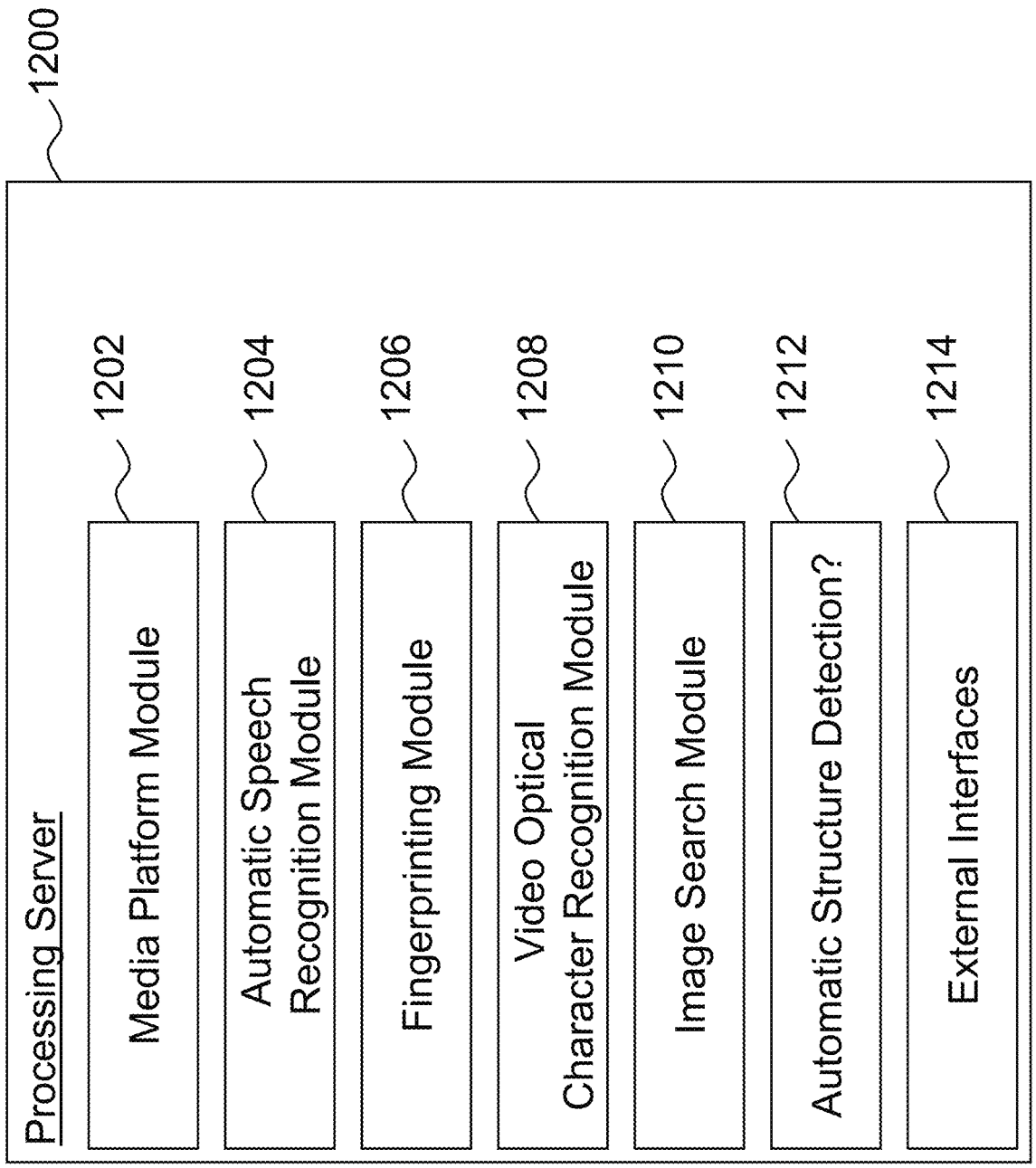
FIG. 12 is a block diagram of an example processing server that includes multiple different modules according to certain example embodiments.

FIG. 12 is a block diagram of an example processing server that includes multiple different modules according to certain example embodiments. A processing server 1200 may be one or more physical servers (e.g., a cluster or server farm). A media platform module 1202 may be provided. This module may tag media content though the automatic processing of channels (e.g., TV channels, internet sources, etc). Tagged information may include: Program type, for example: movies, documentary, sports (e.g., NFL, NBA), news, music, T.V. shows, commercials (e.g., Advertisements); Time of transmission or broadcast, for example: country, region, city, channel #, network (e.g., HBO, NBC, ABC). In certain instances, the module 1202 may provide libraries for content/data to search over. For example, the libraries may include: cars, bicycles, different types of sports (e.g., golf, football, etc).

In certain example embodiments, the module 1202 may provide multi-language support for users to interact with certain services in more than one language (e.g., English, Arabic, and Spanish).

In certain example embodiments, the module 1202 may accept uploads of advertising content with tagged information. In certain instances, such information may include, for example: scene information; frames of the advertisement; a logo associated with the advertisement speech data (e.g., a fingerprint for speech in the advertisement); VOCR textual data; a telephone number (e.g., for linking to an IVR); possible actions that may be taken in relation to an advertisement being triggered (e.g., connect to purchase the good or connect to a website); geographical data (e.g., national, regional, or local listings).

An automatic speech recognition module 1204 may be provided for automatic speech recognition of uploaded content or content that is stored in the content database (e.g., to determine if a character in a sitcom mentions a particular product). A fingerprinting module 1206 may be provided to determine unique characteristics of stored or uploaded content. This may be accomplished by an analysis of the advertisements based on the sound, colors in the ad, or other information that may provide a unique (or nearly unique) fingerprint of an advertisement (or other content) to allow for a quick analysis and matching process.

A video optical character recognition module 1208 may be provided to allow for analysis of text that shown in an image or video. An image search module 1210 may be provided to facilitate imaging searching based on an image that has been uploaded by a user. An automatic structure detection module 1212 may be provided. In certain example embodiments, structure detection may include detection of the structure of uploaded video or audio content. For example, detection of commercial segments versus content from a T.V. show.

The processing server may also include interfaces 1214 to external systems. Such interfaces may allow communication between third party providers. For example, credit card processing, call centers, or services provided by business partners (e.g., through web services) may be accessed through interfaces maintained and/or provided in the external interface module.

Figure 13:
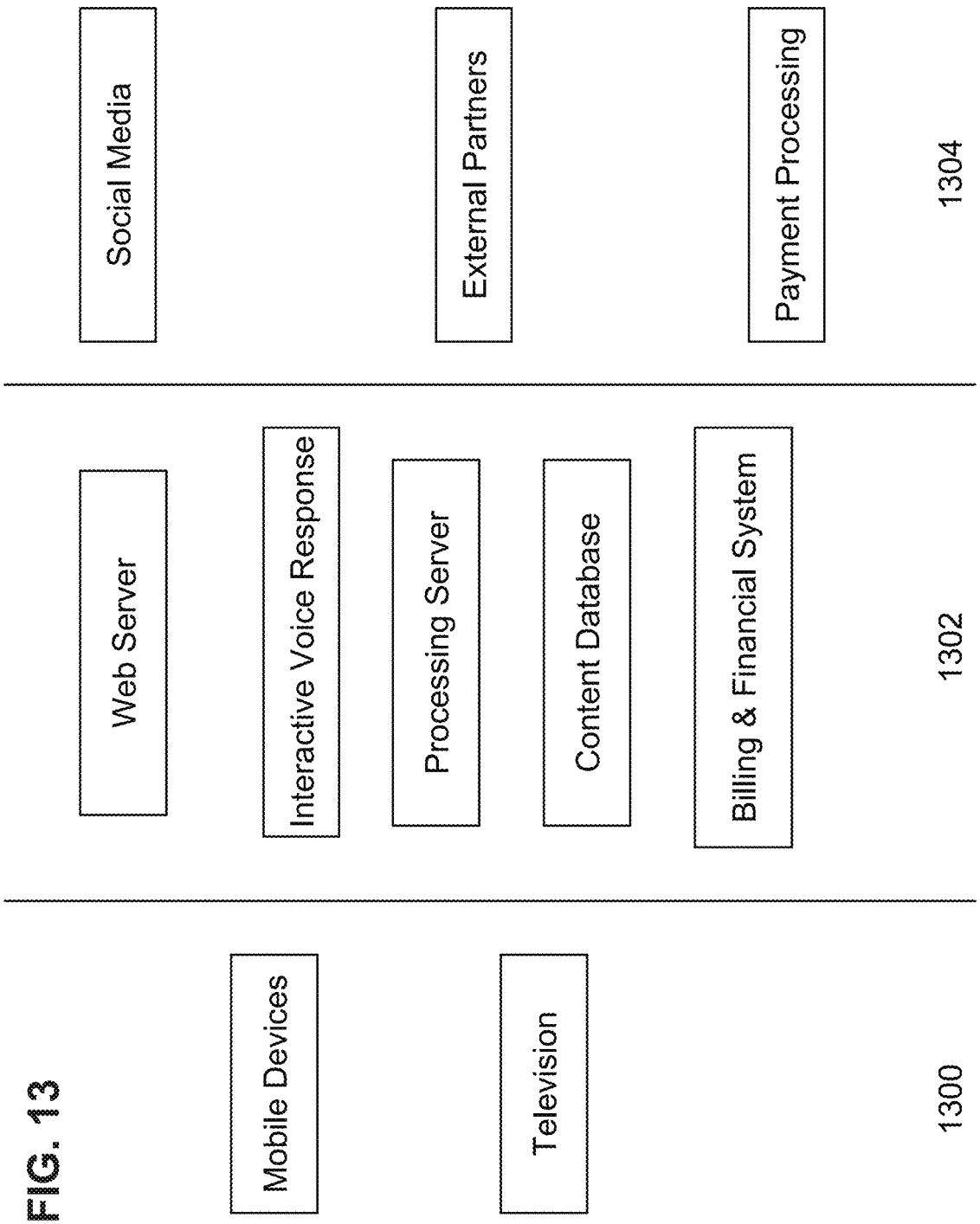
FIG. 13 is a diagram showing example components of systems, apparatus, and services according to certain example embodiments.

FIG. 13 is a diagram showing example components of systems, apparatus, and/or services according to certain example embodiments. In certain example embodiments, a media analysis system that is operated by a provider may include systems in section 1302. For example, a web server may allow users view products. Interactive voice response may provide the ability for a user to speak into their mobile device to interact with the provided system. As explained herein, a processing server may analyze uploaded media content. A content database may store content that the user uploaded media content is compared against. A billing and financial system may also be provided. It will be appreciated that the various components/systems may be provided by other third parties (e.g., as hosted services or the like).

Section 1304 may include those services that are hosted by third party providers or partners. The systems in section 1302 may interact with these systems. The systems may include social media (e.g., facebook, twitter, etc). In certain example embodiments, section 1304 may include external business partners that partner with the media analysis provider in the form of content for the content database (e.g., television station feeds). Section 1304 may also include payment processing (e.g., credit card processing systems).

Section 1300 may include those systems that are operated by a user. For example, a mobile device that is used for uploading media content that is to be analyzed by the systems in section 1302. Thus, the mobile device in section 1300 may communicate with one or more of the systems in section 1302 (e.g., for uploading content) and/or 1304 (e.g., for payment processing).

It will be appreciated that one or more of the systems, devices, etc. shown in FIG. 13 may be moved to other sections. For example, the billing and financial system may be a hosted service and provided in section 1304. Further one or more of the systems may communicate and/or interface with other systems that are in the same section or a different section.

Figure 14:
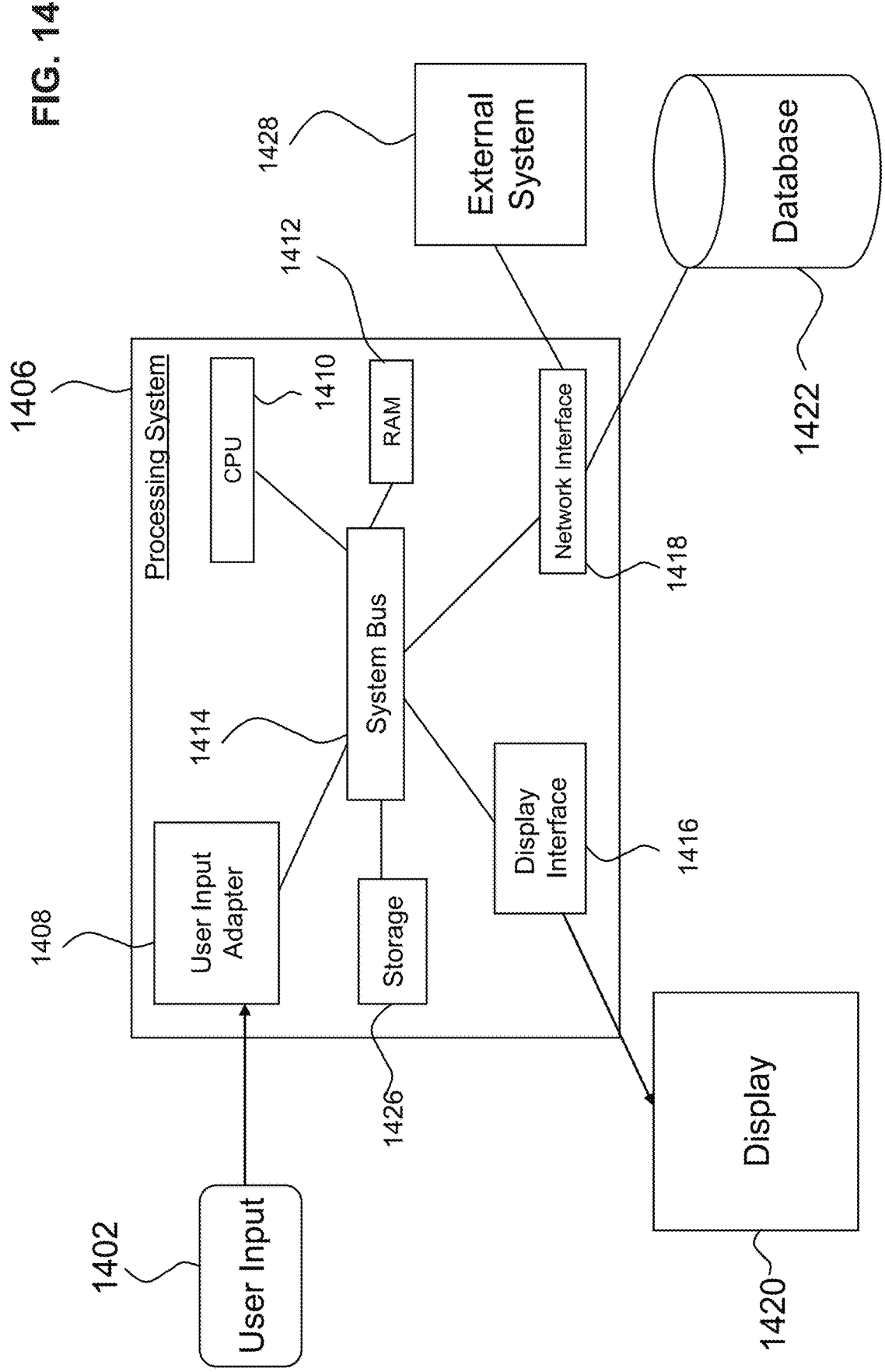
FIG. 14 is an example processing system and interfaces according to certain example embodiments.

FIG. 14 is an example processing system according to certain example embodiments. Processing system 1406 may have a user input device 1402 such as a keyboard, mouse, touch screen, or the like connected to a user input adapter 1408 of the processing system 1406. The user input adapter 1408 may communicate with a system bus 1414. The system bus 1414 may communicate with storage medium 1426, CPU 1410, and RAM 1412. A display 1420 that may be, for example, a LCD display, a television display, or the like, may communicate with a display interface 1416 of the processing system 1406.

The processing system 1406 may also include a network interface to facilitate communication with a database 1422. In certain example embodiments, the database 1422 may store recorded or indexed content (e.g., a television show or the like). The database 1422 may store other data as well, for example, user profile information, or user upload media that is to be processed, etc. The network interface 1418 may also interface with external systems 1428. Example external systems may include, for example, partner web services, web site links, credit card processing systems, etc.

In certain example embodiments, the processing (or analysis) of user generated content may be accomplished on the mobile device of the user. For example, the mobile device may maintain a database of products. The analysis (e.g., pattern recognition) of the user generated content may be performed on the device and products stored in a database on the mobile device may be associated with the created content/media. Thus, for example, the mobile device may include an application that communicates with a service to download product information that is used for analysis. In certain example embodiments, the download of product information may be by category. For example, a user may download product data on cars. Thus, the user may be able to take a picture on the mobile device and have the picture analyzed by the mobile device which may then return information of a good stored in a database on the mobile device.

It will be appreciated that the steps or processing of information (e.g., of user uploaded content) may be performed on a user controlled device (e.g., a mobile device), a processing system of a provider, and/or a third party partner.

In certain example embodiments, an example media analysis system may determine what content within the uploaded media should be matched to stored content. For example, when a user uploads a short video clip from a television show to the processed, the media analysis system may determine a portion of the video (or image) includes a television picture in it. Thus, certain extraneous information may be removed from the video (or image) to facilitate the analysis (e.g., matching) process described herein. For example, background information in the image (or movie) that is not displayed on the T.V. screen may be removed. In certain example embodiments, the user may define a particular section of an image/movie that the analysis process may focus on.

In certain example embodiments, more than one product or service may be associated with a given piece of content. For example, a 5 second video clip of a football game may include multiple goods/services that may be presented to a user as a result of uploading the clip for analysis. For instance, an option to purchase a jersey of one or more players that are shown in the video may be displayed. Additionally, an option for buying tickets to the next home (or away) game may be displayed to the user. Indeed, in certain example embodiments a large number of options may be displayed. These options may be defined by the partner business, the user (e.g., I only want to see buy it now links, not extra information), or by the provider of the media analysis service.

In certain example embodiments geographical data may be used to assist in identifying a service, product, place, etc that is associated with a picture. For example, a user may take a picture of the front of a restaurant. The user may upload the picture to a processing service and may include geographical data regarding where the picture was taken. Based at least in part on the text within the picture and/or the geographical data the processing server may analyze the picture to determine the service (or place of business) in question is "Ray's Pub." The processing server may then send data including reviews for the restaurant to the user's mobile device, offers to book a table, etc. In certain example embodiments the services (e.g., to book a table) may be provided through third party providers and/or through internally provided services.

In certain example embodiments, user may intact with other users (e.g., friends and family) to pass along products and/or user generated content to other users. For example, a user may send a picture or clip to another user. This clip may also be also shared with the associated products or services. For example, after received results of an analysis, the user may forward those results along to another user. In certain example embodiments, user generated content may be submitted but the results may be returned to a user who did not initially submit the content. For example, the user may include the email address or mobile device number of the person who the results should be forwarded to. In certain example embodiments, such sharing may be integrated into various social media services (e.g., facebook, twitter, etc). In certain example embodiments, if a second user ends up buying a product that a first user forwarded to the second user, the first user may get a commission based on the sale. The forwarding of information in such a manner may be a tightly controlled process (e.g., opt-in) or may be more loosely controlled to allow for greater flexibility in forwarding content (e.g., an opt-out system).

Use Cases

In certain example embodiments, a gardening application is provided that allows users to capture content related to nature and obtain information, such as products or services, related to the captured content. For example, a hiker in a public park may see a particular flower and wonder if there is a domestic variety of the flower. With this embodiment, the hiker may take a picture and receive information on the type of flower, where cultivated varieties may be purchased (e.g., a nearby nursery), and/or tips on caring for such a plant.

In certain example embodiments, promotional television advertisements are captured. Various types of merchandise (e.g., kitchen appliances, clothes) or services may be shown to a user while the user is watching television. These advertisements may be "long-form" (e.g., 30 minutes) or "short-form" (e.g., 30 second spots). A user watching such advertisements may use their mobile device to create media content (e.g., audio and/or visual) related to the advertisement. The products discussed in the advertisement may be identified (by a remote service or the mobile device). Once a product or service is identified the user may purchase the same through the mobile device.

In certain example embodiments, a celebrity shopper application is provided. A user watching a television show or a movie may desire to purchase clothing that the actor or actress is wearing. For example, the user may be watching the red carpet ceremony at the Academy Awards. The user can use their mobile device to capture media content that shows the actor or actress wearing a particular clothing style. The clothing in the picture may be identified (either on the mobile device or a remote service) and an opportunity for the user to buy the same (or similar) directly through their mobile device may be presented. In certain examples, similar types of clothing may also be presented to the user (e.g., a less expensive version of a $5000 dress).

It will be appreciated, that the above use cases are discussed by way of example. In certain instances, all of the above techniques may be performed by a mobile device. In certain other cases, only specific applications may be configured on a mobile device.

In certain example embodiments, a user can use a smart phone or tablet device to obtain a video of content that is output through a display device, such as a television. This involves recording the broadcast (a picture or a video clip of the broadcast) that is output from the television on the mobile device, sending the recording (or information about the recording) to a service that can recognize the recorded stream (based on the audio, video, GPS, time, or other information about the recording). The service can also provide a real-time stream, clip, or information about the broadcast to the user of the smart phone. In other words, taking a video of the television broadcast syncs the mobile device with the broadcasted content stream such that the user does not need to continually record the television display in order for the smart device to continue displaying the content stream. Thus, during a first process a user's mobile device acts as a video camera to locally acquire video from a television. During a second process, the user's device acts in a manner similar to television by receiving streamed video information from a remote server (e.g., over the Internet)

FIGS. 15A-15G are screenshots that illustrate a non-limiting television content identification process according to certain example embodiments. In these examples, a user is using a mobile device 1500 (e.g., an iPad®).

Figure 15A:
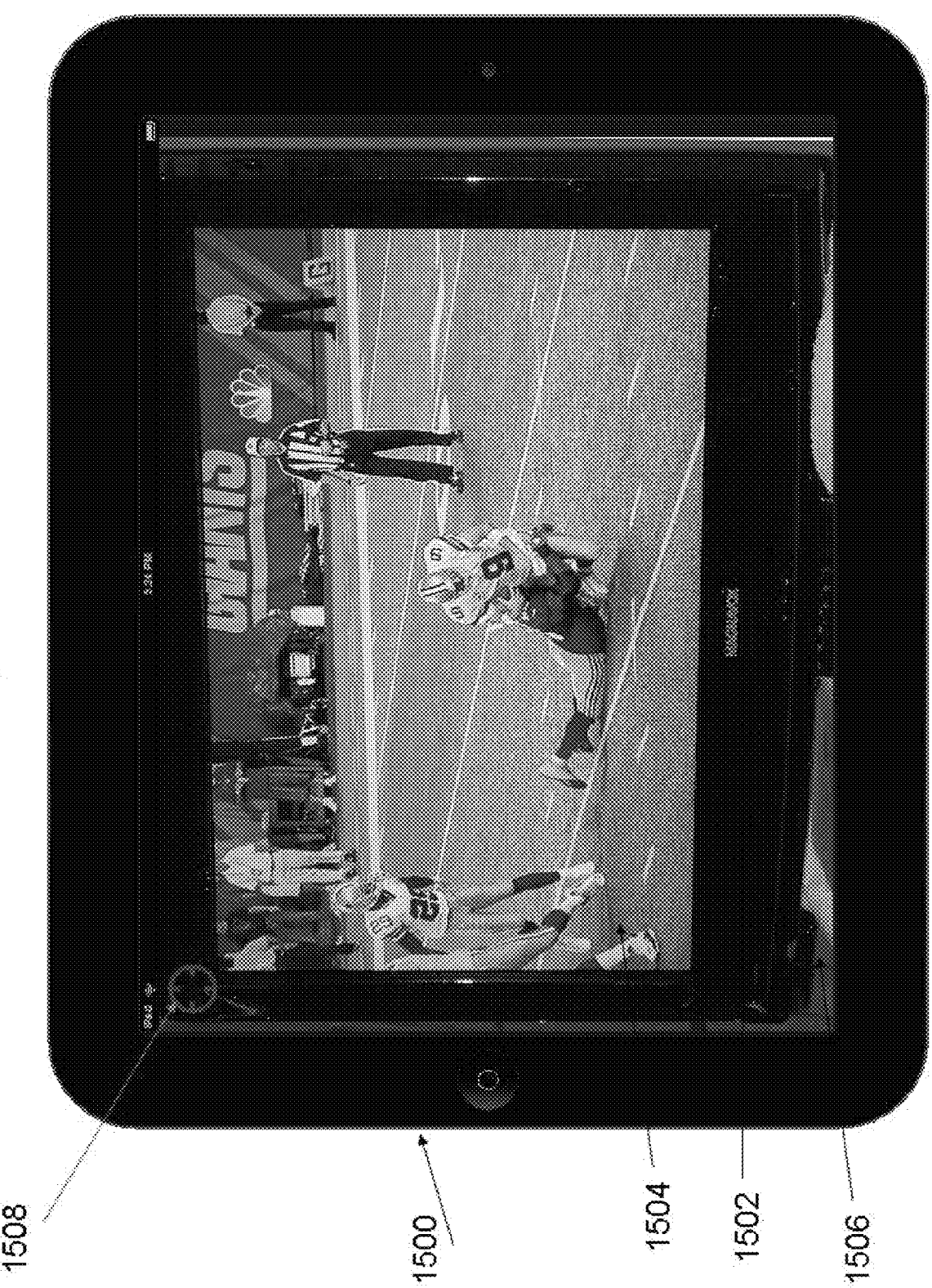

In FIG. 15A, the user directs a camera of the device 1500 to record the external environment. Specifically, the user points the camera of the device 1500 at a television 1502 and begins recording. It will be appreciated that obtaining a video of just the content 1504 without recording additional background content may be difficult. For example, the stand of the television or other extraneous material 1506 may be included in the recorded video. Further, extraneous sounds may also be recorded (e.g., if the user in a sports bar). In view of this problem, the video (or more generally content) acquisition device is configured to obtain only the television content 1504 and/or decrease (or in certain cases remove) extraneous sensory inputs 1506 that are not related to the content 1504 being displayed on the television 1502.

In certain example embodiments, to decrease the influence of audio and/or video noise, the user can tap the screen of the mobile device to indicate the position of the television (e.g., while a video is being obtained). In certain instances, this will also make the camera focus on the screen to get a better picture. The light sensitivity settings of the device may also be set (e.g., optimized) accordingly.

In certain example embodiments, an icon 1508 may overlay the displayed recording and may be configured to be moveable by the user to indicate a corner of the displayed content on the television. In certain examples, more than one icon may be displayed and moveable. In certain examples, no icons may be displayed but instead the user may tap the screen at two (or one) positions to indicate corners of the television. As televisions are generally rectangular in shape information (but may have different aspect rations), expressly identifying a corner of the television may increase the success rate of acquiring the content and removing extraneous information from the recording. It will be appreciated that other techniques are contemplated. For example, an object recognition process may be performed to determine the location of a television and subject content display (e.g., without user specification of a position)

Figure 15B:
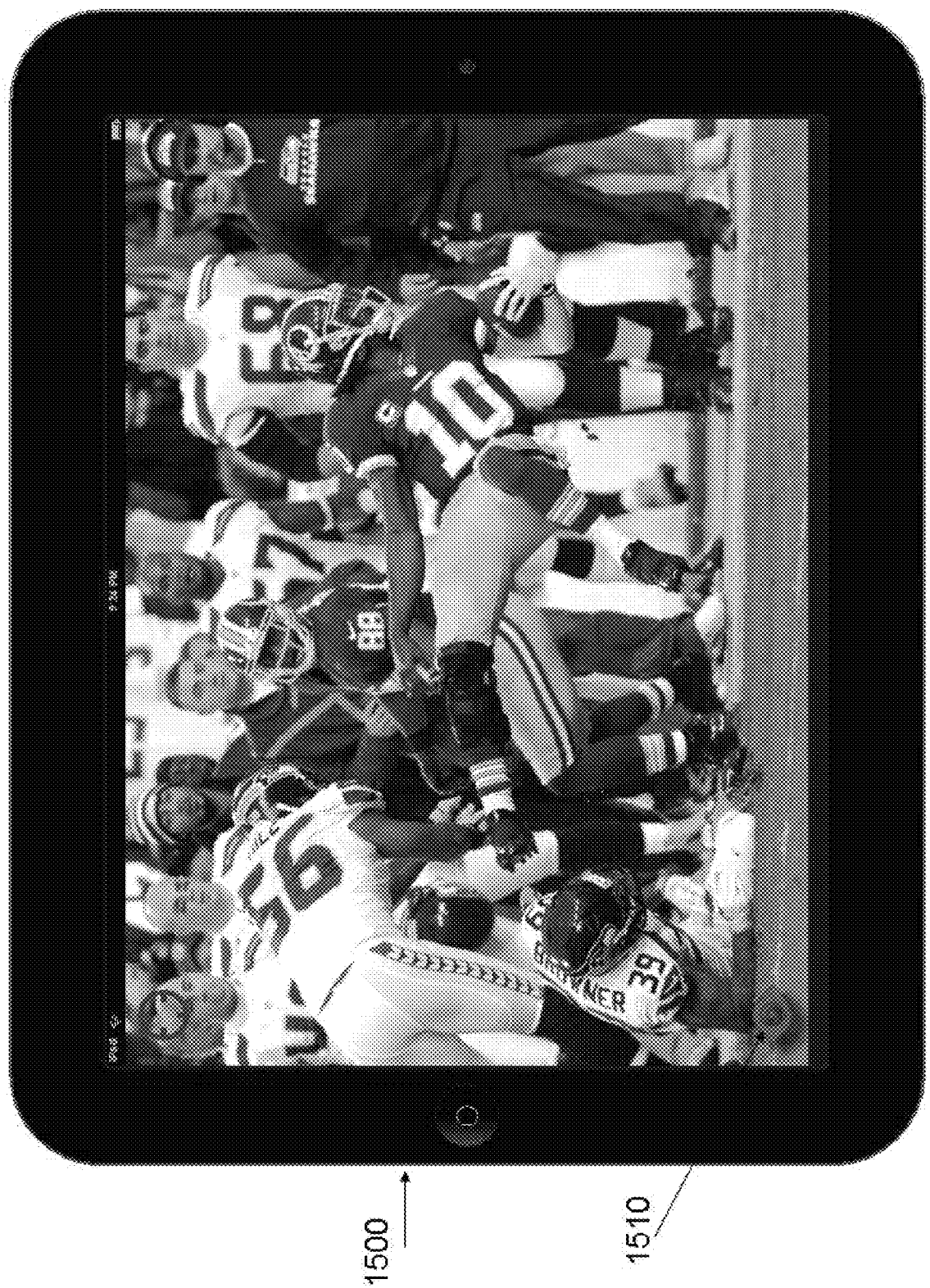

Once the television (e.g., the quad) is identified, an adjusted and/or normalized display of the acquired content is presented to the user on the display of the mobile device 1500 as is shown in FIG. 15B. An indication that the picture from the television has been acquired (e.g., extraneous content is not shown) is displayed as icon 1510 in the lower left of the screen. In an alternative embodiment, the icon 1510 can be used to provide the user with the capability to freeze (e.g., pause) a running video so that the user can identify objects within the pause video stream. In certain example embodiments, no icon may be displayed or another type of indication may be shown to the user (e.g., a red dot, or a textual indication). In certain example embodiments, the displayed content may be streamed from a remote server after the television content is identified. In other words, the content that is displayed when the icon 1510 is displayed may be content that has been acquired via a network transceiver of the device rather than the camera of the device.

In certain example embodiments, the displayed content may be supplemented with visual cues indicating that certain objects in the display are recognized and actionable. In FIG. 15C, five different football players have been recognized (either automatically, or manually—e.g., by a customer service representative, or other users) by the system. When an object is recognized a circle (or other shape) may be imposed over that portion of the displayed content. This provides a user with an indication of where to tap the screen (or other wise indicate) to perform a further action that is tied to the recognized object (e.g., to obtain further information, or buy a particular project, etc. . . . ).

In certain example embodiments, the area that is actionable by a user may be displayed with an orange hue superimposed over the recognized object. It will be appreciated that other techniques of providing a visual identification for a user of an actionable object may be used (e.g., changing the color of the object or creating a transparent icon, etc).

In addition to displaying the recognized objects, the mobile device may include functionality that is activated by triggering (e.g., via touch input) home menu buttons 1512, 1514, 1516, and 1518. The following are example functionalities that may be triggered when a button is activated by the user. The home menu may include button 1512 that allows a user to highlight additional objects within the screen. In certain examples, the button 1512 may allow a user to tag and/or enrich an object with user defined information (e.g., "I love this player!"). The home menu may include button 1514 that allows a user to trigger additional functionality buttons (1540) regarding the highlighted objects. In certain example embodiments, triggering button 1514 may present further information about a selected object (e.g., stored database information that may include products, services, or general knowledge). The home menu may include button 1516 that allows a user to zoom within the screen. In certain example embodiments, a user can trigger button 1516 to search for objects that are related to the selected object. This can either be within the current image/clip or in other video streams. In other words, the user's mobile device may request other objects that are the same as, or similar to, the selected object. The home menu may include button 1518 whose functionality includes, but is not limited to, allowing a user to access information and settings for the user of the computing device. It will be appreciated that the functionality of the buttons is exemplary and that any one of the processes described herein may be triggered by activating a button.

FIG. 15D is a screen shot that shows playback and sharing functionality for the synchronized content. A control bar 1530 is provided over (or in addition to) the displayed content. The control bar 1530 includes an indicator 1532 that corresponds to a point in time when the mobile device synchronized with the video. Time span 1534 indicates indicate a time frame of the video content that the user can view. In this example, the user can view the video from a point in the video 1536 to the synchronized point 1532 (or some point beyond the synchronized point). In other words, a user can go back in time before the synchronization time (or the current time) and request info about objects that were displayed at some prior time in the video. Accordingly, users may scroll back to see a scene or play in a game that they "missed." They can then request additional information about an object in that prior scene. For example, a user may see a car in a movie, but may only synchronize with the television after the car is no longer being display. However, with this technique a user can backtrack to still acquire information about the car by viewing it on their mobile device.

In certain example embodiments, the mobile device may only allow a user to adjust the time of the video content to a certain degree. By way of example, if synchronization is at time X, the user may be allowed to see content that is between X+1 minute and X−1 minute.

The control bar 1530 also includes button 1538 that allows a user to share certain portions of the displayed video. The portions can be video clips and/or images from the video stream. Other controls for pausing, zooming, taking a picture, etc are also provided on control bar 1530. In certain example embodiments, controls for requesting information (or buying) based on the whole video (as opposed to a portion of the video) may be included in the control bar.

FIG. 15E is a screen shot showing the display after the user has selected one of the objects shown in FIG. 15C. In particular, a further menu of options 1540 is displayed after the selection of object 1548. The menu may include button 1542 that allows a user to request information about the selected object (as opposed to the whole scene as shown in FIG. 15D). Button 1544 allows the user to buy merchandise (e.g., football jerseys) or other items associated with the selected object (e.g., the football player shown in FIG. 15E). Button 1546 allows a user to forward either the selected object or information about the object (e.g., the information connected to buttons 1542 or 1544) to another user.

Figure 15F:
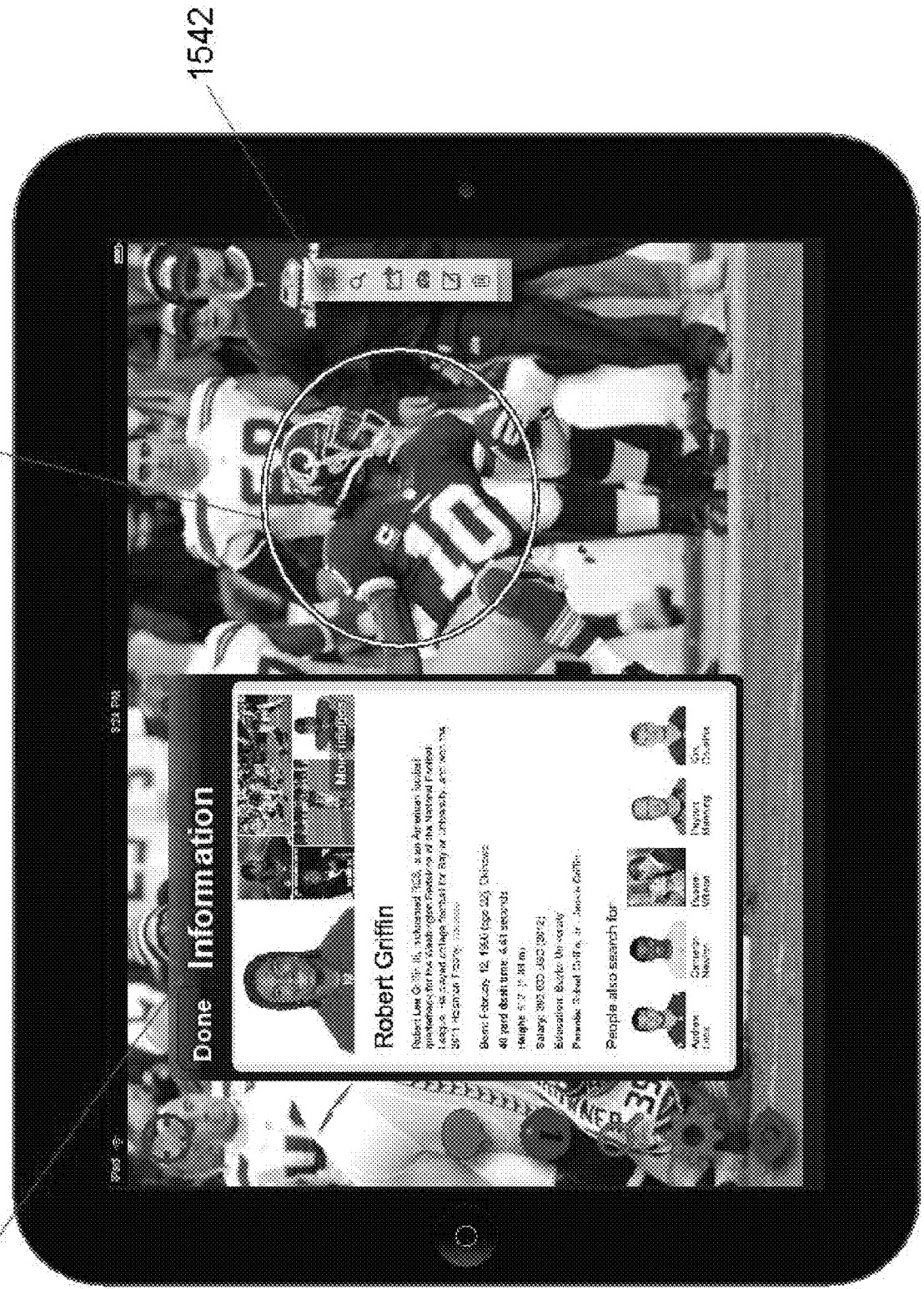

FIG. 15F shows an information section 1560 displayed as a result of the user selecting button 1542 when object 1548 is selected. This display may be generated as a result of submitting a query to a search engine or the like based on the recognized object 1548.

Figure 15G:
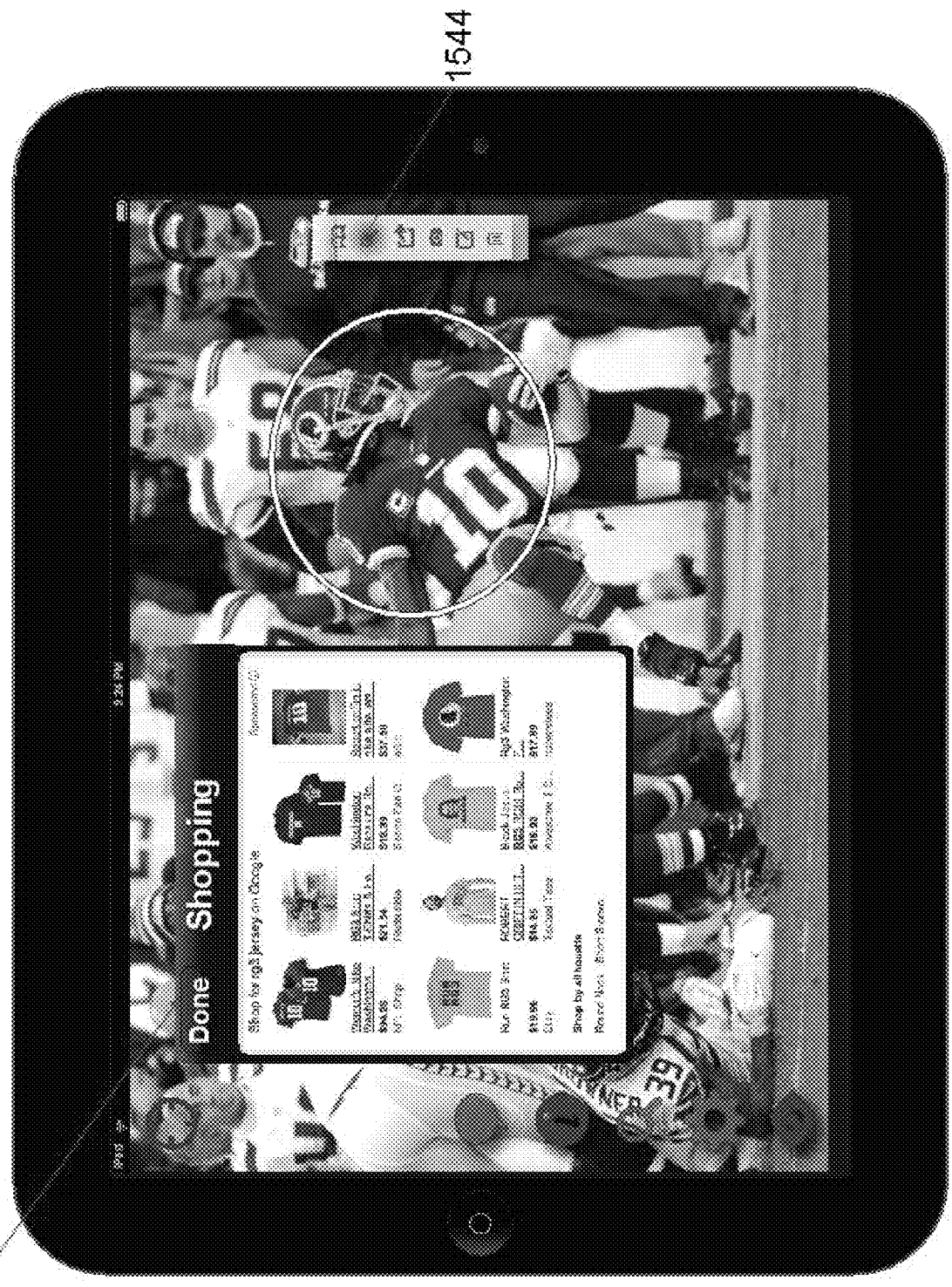

FIG. 15G shows another information section 1570 that displays shopping options as a result of the user selecting button 1544. When this screen is displayed a user can find products related to the object (using e.g. eBay or Amazon) and/or websites related to the object (e.g., using search engines).

Figure 16:
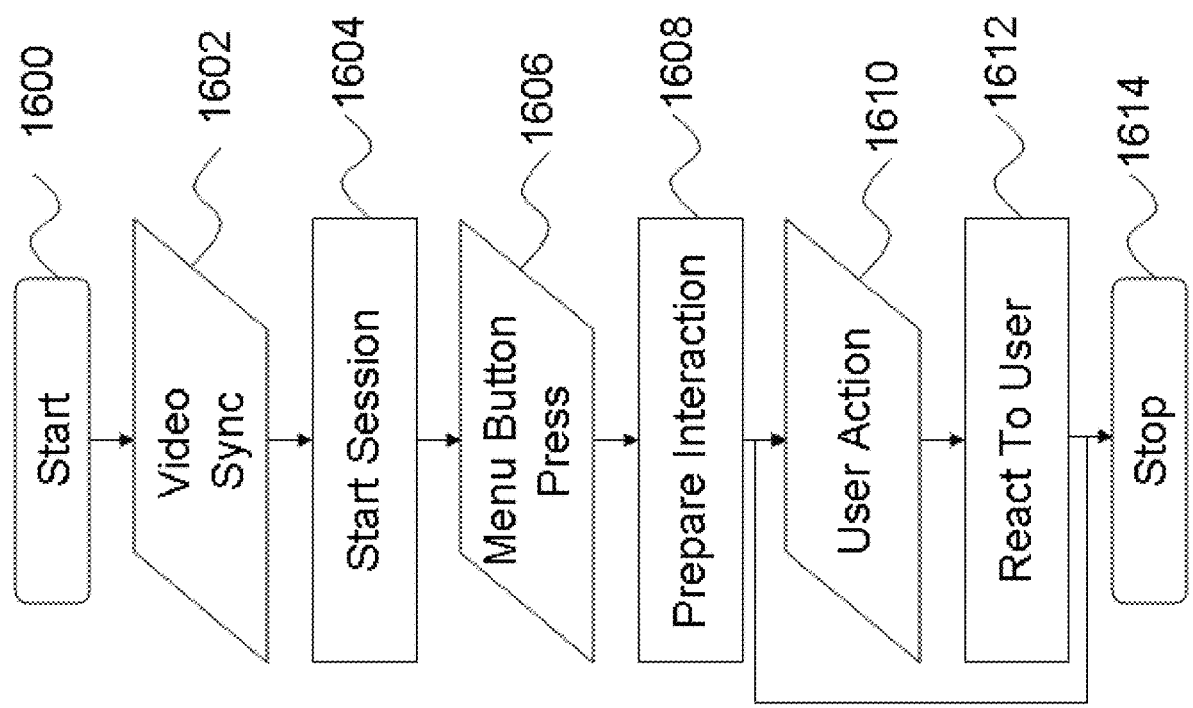
FIG. 16 is an example process of a user interacting with video content.

FIG. 16 is an example process for interacting with a mobile device according to certain example embodiments. In step 1600, the smart phone or tablet application is loaded and/or started. This initialization process may include authentication against a remote computing resource that is configured (e.g., programmed) to provide dynamic content (e.g., content that is based on user interaction with their device) to the user and their mobile device.

In step 1602, a video is synchronized. Specifically, the user begins acquiring video by using a built-in (or attached) camera of the mobile device. The acquired video is then matched against static and dynamic databases that are either provided locally on the user's mobile device or remotely (e.g., as a cloud based computing service). In certain example embodiments, the mobile device communicates with remote computing resources (e.g., as shown in FIG. 17) so as to recognize a particular video that is being recorded by the user's camera.

In step 1604, a virtual session is started on a remote computing resource (e.g., the "backend" of the system that is communicating with the user's mobile device). The virtual session is configured to simulate and/or track the user's actions (e.g., with respect to the video being recorded. The session information that is tracked includes user and interest data, such as the broadcast channel, video, location information, interactions with knowledge databases, information flow, interactions with consumer portals, and other information.

In certain alternative embodiments, the session may include transmitting a video stream to the mobile device that corresponds to the channel/broadcasted content that was previously recognized in step 1602. In other words, after acquiring a video via the mobile device's camera and displaying the same on the display of the device, the source of the display will be shifted to content that is transmitted from the remote server. This "switch-over" may occur when the initially recorded video is identified by the remote computing resource. This technique may then allow a user to view video portions that occurred before the user started recording.

In step 1606, the user provides input to interact with the displayed content. In certain example embodiments, this may be a result of a touch action on a touch screen display. However, other user input action are contemplated (e.g., voice commands, or physical button actuation, etc). The mobile device may determine what portion of the display has been touched and transmit that information to the remote service. In certain example embodiments, the virtual session may then "mimic" this touch action to determine the location of the touch with respect to recognized objects in the displayed content. It will be appreciated that this process may be based entirely on the mobile device or may be performed on the mobile device in conjunction with the remote service.

In step 1608, a video snippet of the broadcasted channel/video with a pre-defined amount of time is uploaded. Metadata regarding detected objects may also be uploaded as part of this upload process. In certain example embodiments, the detection of objects within the video is automatically accomplished. In certain example embodiments users can manually define objects within the video sequence. For example, the touch input of a mobile device can be used to allow a user to draw or otherwise indicate one or more objects within a recorded scene. Accordingly, objects may be manually marked or tagged based on user input.

In step 1610, another user action is detected by the mobile device (e.g., by tapping an action button on the display). For example, the buttons shown in FIG. 15E may be triggered by user input. The actions that are taken may include: 1) sharing of information or a snippet of the video via social media (e.g., facebook, twitter, etc); 2) manually (or triggering the automatic tagging) of objects in the video; 3) requesting information on objects; 4) shopping for products or services that are associated with the indicated object.

In certain example embodiments, the snippet that is shared may be edited before sending (e.g., in terms of size, or tagged information). In certain example embodiments, the information retrieval and/or shopping options may be based on the object within the context of the video/show/movie/game/etc or outside of such context. For example information on particular football player may be retrieved generally (outside of the current context) or specifically (within the context of the current game being played).

In step 1612, the system is programmed or configured to react to a user's request using search engine access, open source and non-open source database access, access to social media providers (e.g., if the user consents and provides user access information), live and non-live stream and non-streaming video database access, access to consumer and commerce platforms (e.g., e/m-commerce and brick and mortar stores). Once the information associated with the user's request is retrieved it is presented to the user on their display device (e.g., as shown in FIG. 15G). In step 1614, the session is stopped and the smart phone or tablet app is terminated.

Communication between a mobile device (e.g., phone/tablet) to service (e.g., a remote computing system) is a combination of either all or part of: 1) video over ip; 2) abstracted image information; 3) local user data (with consent of user); 4) contacts; 5) images; 6) location information; 7) other personal; 8) language; 9) information (transient or non-transient)

Information that is communicated from the service and mobile device is a combination of either all or part of: 1) extracted and digested information from open source and closed source knowledge databases in an appropriate language (English, Arabic, Spanish, etc); 2) images, videos, microblogs, social media posts, etc.

The communication between a service and the user's computing device (e.g., a mobile computing device) can be performed with encryption, or without encryption, compressed, or non-compressed.

FIG. 17 is a block diagram of IDenTV system 1700 that provides interactive functionality to a user viewing video content according to certain example embodiments. The system 1700 communicates with a smart device 1702 through an input/output interface 1704 (e.g., a network transceiver). The system 1700 includes multiple different functional units (e.g., software programs that are implemented on the hardware of system 1700) such as the search result aggregator. These functional units communicate (or are a part of) a fusion engine 1706 that combines the various information sources to provide a cohesive information result to the user of the smart device 1702 that is querying the recorded video stream. The system 1700 communicates with various external sources that may be open or proprietary. For example Social media provider 1 may be a facebook interface API (application programming interface) that allows the system 1700 to communicate with a user's facebook account (e.g., to post a video clip or the like). The system 1700 may also include various internal databases that track how users have tagged or shared certain video portions.

In certain example embodiments, the fusion engine 1706 runs as a hosted service on a server farm (e.g., a cloud based service). A interactive user interface on the smart device 1702 can then give the user the capability to interact (request and enrich) the viewed video content with additional data.

In certain example embodiments, once a user's device is synchronized with a remote service, the user can request information regarding objects (or an area) that are within the clip/stream. This information can be dynamically generated (an object recognition process), manually entered by the service (e.g., a customer service agent can manually "tag" RGIII with a link to buy his jersey), or based on other users (see below). For example, if there are many different football players on the screen a user can select a player for additional information (or request to purchase something associated with that object).

There may be multiple different ways to select an item/object that is displayed in a video stream. For example, a user can draw on the smart device (e.g., a circle) or may tap a specific area, etc. The selection and/or recognition of objects within a video scene can be combined with the below discussed social aspect (e.g., objects can be highlighted based on previously requests and/or purchases). In certain examples, the type of highlighting may be adjusted depending on the number of requests associated with that object. For example, a football player with many associated requests can be highlighted with a red indicating that they are "hot."

In certain example embodiments, users are provided with the ability to view content on their smart device from before the synchronization process. Such functionality allows users to be reactive to moments on the screen rather than consistently being ready to synchronize at a moments notice.

In certain example embodiments, all of the objects within a displayed video scene may be listed for a user to select. The user may select and run the same process as described above, but with textual information, rather than visual information.

In certain example embodiments, a user can tag individual objects (or screen areas) of a video. This can be done explicitly by a user (e.g., "I like this shirt") or implicitly (e.g., by requesting more information about an object in that area). If a user purchases a particular shirt that information is recorded by the service (e.g., by system 1700). In certain example embodiments, users can expressly share clips and/or their purchasing decisions with other users. Information regarding user interaction with the system and the synched stream is tracked (e.g., what the user is requesting, or looking at) to build a profile for that user. More relevant contextual information may then be presented to the user based on this information. In certain example embodiments, the input provided by users can help to guide and/or highlight objects within a scene and/or what products/information should be displayed to a requesting user.

In certain example embodiments, users can link and/or connect their user account to other social networks, e.g. Facebook, Twitter, YouTube, Vine, etc. in order to share information with others in these networks. A user can allow the system to access personal information of the user in these social networks, e.g. pictures, videos, personal information.

This information (e.g., user data) can be collected and kept in the system. Anonymized information can be shared with a content provider or with product providers that are of relevance to the user. This information can be compiled to support the user's needs by communicating customer interests back to content and product providers.

In certain example embodiments, video search can be based not just on the general title, meta-data, or rich meta-data, but also on people, objects, etc as they exist within the video stream (e.g., pictures, images, logos, frames, etc). Thus, a user can interrogate specific portions of a video and obtain different results based on the portion that is interrogated. For example, if two football players are displayed, clicking on one will result in one type of response from the system (e.g., buying that player's jersey), while indicating an area associated with the other player will result in a different response (e.g., buying that player's jersey). Thus, a user can click and zoom on the sub-images (e.g., objects) within the frames of video.

In certain example embodiments, the video stream displayed on the user's mobile device is streamed to the device without the use of the camera of the device. Specifically, the camera may be used to initially identify a video stream from a television and from that identification, a video stream may be obtained directly from the remote server device (e.g., from a content provider over the Internet). In certain examples, the initial synchronization with the television is not required, but rather the device directly receives a content stream. Thus, users can interact as they watch the stream and conduct the operations and functionality described herein. For example, if a user sees an actor or a player while watching on the mobile device, the user can click on the person and trigger, for example, the search functionality described herein.

While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

We claim:

1. A mobile computing apparatus for recognizing and interacting with video content displayed on a remotely located display apparatus, the mobile computing apparatus comprising:
   a camera configured to acquire video;
   an integrated display device that is layered with a touch screen configured to receive input from a user of the mobile computing apparatus;
   a transceiver configured to communicate with a remote computing apparatus; and
   a processing system that includes at least one processor, the processing system configured to:
      cause the camera to begin acquisition of a first video of video content being displayed on the remotely located display apparatus;
      transmit, using the transceiver and to the remote computing apparatus, first data that is based on the acquired first video, the remote computing apparatus configured to use the first data to perform a synchronization process that synchronizes the first video, based on the first data, with at least one of plural different video streams being independently received by the remote computing apparatus,
      output, to the integrated display device, a second video that corresponds to the acquired video content and is based on the synchronization process performed on the remote computing apparatus;

while the second video is displayed on the integrated display device, receive, via the touch screen, a touch input from the user that indicates a location within the display screen or the second video content that is displayed;

responsive to reception of the touch input, transmit, to the server computing system, the location of the touch input within the display screen or the second video content that is displayed;

receive, from the remote computing apparatus, dynamic informational content that is based on identification, by the remote computing apparatus, of an object within the identified and independently received video stream that corresponds to the location; and output, to the integrated display device, the dynamic informational content, wherein the dynamic informational content is determined by the remote computing apparatus by mimicking, within the identified and independently received video stream, the location indicated by the touch input.

2. The mobile computing apparatus of claim 1, wherein the dynamic informational content includes a plurality of products and/or services that are purchasable by the user, wherein the processing system is further configured to:

receive a selection of at least one of the products and/or services;

transmit, via the transceiver, the selection to the remote computing apparatus; and receive an acknowledgement response from the remote computing apparatus that the purchase has been completed.

3. The mobile computing apparatus of claim 1, wherein the dynamic informational content is output in real time synchronism with transmission of the second data that is based on the touch input.

4. The mobile computing apparatus of claim 1, wherein the processing system is further configured to:

receive, from the remote computing apparatus, the second video, wherein the second video is subsequently displayed on the integrated display device, the second video being transmitted from the remote computing apparatus based on the performed synchronization process.

5. The mobile computing apparatus of claim 1, wherein the processing system is further configured to:

while the second video is displayed on the integrated display device, receive, via the mobile computing apparatus, a video clip selection input from the user that selects a length of the second video; and responsive to the video clip selection, cause the selected length of the second video to be transmitted to another user.

6. A process for interacting with video content comprising:

enabling a mobile computing device having a camera portion to use the camera portion to acquire video content shown on a display apparatus and to transmit, to a server computer system, by using a wireless transceiver of the mobile computing device, first data that is based on the acquired video content;

receiving, with the server computer system, a plurality of different video streams, each of which includes video content, including one of the video streams corresponding to the video content displayed on the display apparatus, the server computer server receiving the plurality of video streams independently of the mobile computing device and the display apparatus;

identifying which one of the plurality of different video streams corresponds to the video content displayed by the display apparatus;

receiving the first data and using the received first data to synchronize the acquired video content shown on the display apparatus with the video content received by the server computer system;

displaying a visual presentation to a user of the mobile computing device based on the performed synchronization;

receiving, via an input device associated with the mobile computing device, a touch input from a user that indicates a location in the visual presentation that is displayed to the user;

responsive to reception of the touch input, transmitting, to the server computing system, second data that is indicative of the location indicated by the touch input of the user;

using, at the server computing system, the transmitted second data that is indicative of the location to identify at least one object in the independently received video stream that the touch input has indicated;

sending electronic data to the mobile computing device in response to the identification of the at least one object; and displaying the electronic data on the mobile computing device to the user, wherein identification of the at least one object in the independently received video stream accomplished by mimicking, within the independently received video stream, the location indicated by the touch input.

7. The process of claim 6, wherein:

the electronic data message comprises an image(s) related to at least one product and/or service;

while the image(s) related to the product and/or service are displayed, receiving a user selection of at least one of the products and/or services;

transmitting, via the transceiver, the selection of the product and/or service to the server computing system; and receiving an acknowledgement response from the server computing system that the product and/or service has been selected.

8. The process of claim 6, further comprising:

receiving, from server computing system, the video that is displayed on the display apparatus comprising a display screen integrated with the mobile computing device, the video being transmitted from the server computing system based on the performed synchronization process.

9. The process of claim 6, further comprising:

determining, within a display frame of the acquired video, where the video content in the acquired video is being displayed, wherein the first data is based on where the video content is determined to be within the display frame of the acquired video.

10. A multimedia identification system for recognizing and interacting with first video content received and displayed on a remotely located display apparatus, the video content also independently received by a server computer system, the multimedia identification system comprising:

a server computer system that includes: (1) video source input(s) configured to receive plural different video feeds that include a second video content that is the same as the first video content displayed of the remotely located display apparatus, the second video content received at the server computer system independently of reception of the first video content by the remotely located display apparatus, (2) at least one hardware processor configured to process the video content received via the video source input(s), (3) a first transceiver, and (4) an electronic memory storage medium; and a mobile computing apparatus that includes:
- a camera configured to acquire video of video content being shown on the remotely located display apparatus,
- an integrated touch screen display,
- at least one hardware processor, and
- a second transceiver configured to communicate data based on the video acquired by the camera to the server computer system that is also independently receiving and processing video content received via the video source input(s), the first transceiver of the server computer system configured to receive the communicated data, the at least one hardware processor of the server computer system configured to, in response to reception of the communicated data, perform a real-time identification process to determine video content of the received plural different video feeds that correlates to the acquired video of the mobile computing apparatus;

the integrated touch screen display of the mobile computing apparatus configured to display, in accordance with the performed real-time identification process, a video that corresponds to the determined video content;

the at least one hardware processor of the mobile computing apparatus configured to:
- while the video content is displayed on the integrated touch screen display, process a touch input received via the integrated touch screen display at a location within the displayed video,
- responsive to the received touch input, cause the transceiver of the mobile computing apparatus to transmit second data that indicates the location within the displayed video that the user indicated, the at least one hardware processor of the server computer system configured to:
- in response to reception of the second data, determine at least one object within the independently received second video content that corresponds to the indicated location, and
- cause the first transceiver to transmit a dynamic content data that includes information regarding the determined at least one object, the at least one hardware processor of the mobile computing apparatus configured to cause the integrated touch screen display to display image(s) based on the dynamic content data, wherein the determination of the at least one object in the independently received second video content is accomplished by mimicking, within the independently received video stream, the location of the touch input.

11. The multimedia identification system of claim 10, wherein the at least one hardware processor of the server computer system is further configured to cause the first transceiver to transmit, to the mobile computing apparatus, the video that corresponds to the determined video content.

12. The multimedia identification system of claim 10, wherein the at least one hardware processor of the mobile computing apparatus is further configured to determine where the video content being shown on the remotely located display apparatus is located within a display frame of the acquired video.

13. The multimedia identification system of claim 10, the at least one hardware processor of the mobile computing apparatus configured to:
- receive, via the mobile computing apparatus, selection input from the user that identifies a clip of the second video; and
- responsive to the selection input, transmit further electronic data that causes the clip of the second video to be transmitted to another computer system for access by another user.

* * * * *